United States Patent
MacKenzie et al.

(10) Patent No.: US 7,676,909 B2
(45) Date of Patent: Mar. 16, 2010

(54) APPARATUS FOR ASSEMBLING A CLOSURE TAB TO A LID

(75) Inventors: Ralph William MacKenzie, Okemos, MI (US); Tyler James DeLong, Holt, MI (US); Ryan P. Gingras, Grass Lake, MI (US)

(73) Assignee: Dart Container Corporation, Mason, MI (US)

( * ) Notice: Subject to any disclaimer, the term of this patent is extended or adjusted under 35 U.S.C. 154(b) by 184 days.

(21) Appl. No.: 11/852,505

(22) Filed: Sep. 10, 2007

(65) Prior Publication Data

US 2007/0294886 A1 Dec. 27, 2007

Related U.S. Application Data

(62) Division of application No. 10/605,263, filed on Sep. 18, 2003, now Pat. No. 7,523,534.

(60) Provisional application No. 60/319,560, filed on Sep. 18, 2002, provisional application No. 60/319,655, filed on Oct. 29, 2002.

(51) Int. Cl.
*B23P 19/00* (2006.01)

(52) U.S. Cl. ...................................................... 29/797
(58) Field of Classification Search ............... 29/797, 29/700, 706, 707, 721, 729, 742, 757, 559, 29/760, 430, 412, 453, 428, 429; 264/545, 264/152, 248; 425/302.1, 388, 501; 156/73.5
See application file for complete search history.

(56) References Cited

U.S. PATENT DOCUMENTS

| | | | |
|---|---|---|---|
| 3,422,522 A | 1/1969 | Mojonnier | |
| 3,705,932 A | 12/1972 | Hurst et al. | |
| 4,496,408 A * | 1/1985 | Hahn | 156/73.5 |

FOREIGN PATENT DOCUMENTS

| | | |
|---|---|---|
| CH | 554161 | 9/1974 |
| DE | 1704347 | 8/1972 |
| EP | 0684122 | 11/1995 |
| FR | 1570016 | 6/1969 |
| FR | 2613982 | 10/1988 |
| FR | 2736620 | 1/1997 |

* cited by examiner

*Primary Examiner*—John C Hong
(74) *Attorney, Agent, or Firm*—McGarry Bair PC

(57) ABSTRACT

A method and apparatus for assembling a first thermoformed workpiece, such as a tab closure, to a second thermoformed workpiece, such as a lid.

33 Claims, 35 Drawing Sheets

APPARATUS FOR ASSEMBLING A CLOSURE TAB TO A LID

CROSS REFERENCE TO RELATED APPLICATIONS

This application is a divisional of U.S. patent application Ser. No. 10/605,263, filed Sep. 18, 2003, now U.S. Pat. No. 7,523,534, issued Apr. 28, 2009, and further claims the benefit of U.S. Provisional Patent Application Nos. 60/319,560, filed Sep. 18, 2002 and 60/319,655, filed Oct. 29, 2002.

BACKGROUND OF THE INVENTION

1. Field of the Invention

The invention relates to a disposable, reclosable lid having a closure tab for selectively closing a drink opening of the reclosable lid. More specifically, the invention relates to an apparatus and method for automatically assembling the closure tab to the lid.

2. Description of the Related Art

Disposable lids have long been used for closing the top of a beverage container, especially for beverages that are purchased "to go," such as from a fast-food restaurant, for example. The disposable lids used with containers for heated drinks such as coffees and the like are often provided with a closure tab that the user can manipulate to selectively close a drink opening in the lid, thus permitting the user to drink the heated beverage when desired while otherwise keeping the drink opening closed to reduce the convective cooling of the beverage and reducing the spilling of the beverage as it moves in response to the user moving the cup.

Disposable lids of this nature are typically made by thermoforming a suitable plastic, such as High Impact Polystyrene (HIPS). The thermoforming process has the advantage of being able to produce high-quality, low-cost lids at high volumes as compared to other manufacturing techniques such as injection molding, which can make more complex shapes than thermoforming but generally has lower production rates and higher tooling costs.

For most thermoformed, reclosable lids, the tab closure is integrally formed as part of the cover, thus requiring the user to tear back the tab closure from the cover when initially opening the reclosable lid. Tear guides of some sort are normally formed on the lid to aid the user in tearing back the tab closure. After the tab closure is torn along the tear guides a discontinuity remains between the lid and the tab closure at the tear guides even when the tab closure is closed. The beverage can seep out through the discontinuity as the beverage is sloshed while the container is moved by the user, resulting in a suitable but imperfect seal.

Therefore, there is a desire to have a disposable, reclosable lid with the cost and production benefits of the thermoforming process while providing a better seal between the tab closure and the lid than is currently obtainable with thermoformed lids having an integral tab closure.

SUMMARY OF THE INVENTION

The invention addresses the disadvantages of the prior art by providing a method and apparatus for assembling a first thermoformed workpiece, such as a tab closure, to a second thermoformed workpiece, such as a lid, without the need to temporarily store either workpiece. In the context of a tab and lid operation, the apparatus and method for assembling the tab closure to the lid are automated and integrated into the traditional thermoforming lid manufacturing process thereby maintaining the cost benefit and production volume attributable to thermoformed lids.

In one aspect, the invention relates to an automated manufacturing line for making a composite thermoformed article from first and second thermoformed workpieces by automatically assembling the first thermoformed workpiece to the second thermoformed workpiece. The automated manufacturing line comprises a thermoforming station for thermoforming the first and second thermoformed workpieces in a plastic sheet, a trim station for trimming at least the first thermoformed workpiece from the plastic sheet; and an assembly station for assembling the first thermoformed workpiece onto the second thermoformed workpiece to form the composite article.

The assembly station can assemble the first thermoformed workpiece to the second thermoformed workpiece in a number of methods, including: press-fitting, snap-fitting, bonding, or ultrasonically welding.

The assembly station can comprise a carrier that moves between a first position, where it picks the first thermoformed workpiece, and a second position, where it assembles the first thermoformed workpiece to the second thermoformed workpiece. A suction device can be added to the carrier to pick the first thermoformed workpiece as it is trimmed from the sheet and hold the first thermoformed workpiece as it is carried to the second thermoformed workpiece. Additionally, a force reliever can be added to the carrier to control the amount of force applied by the carrier to the first and second thermoformed workpieces as they are assembled.

The carrier can comprise a reciprocating arm on an end of which the suction device is mounted. The force reliever can be used to mount the suction device to the end of the arm. The reciprocating arm reciprocates between a pick-up position that corresponds to the first position, and an assembly position that corresponds to the second position. The direction of reciprocation is preferably either parallel or transverse to the machine direction as defined by the movement of the plastic sheet through the assembly station.

Multiple carriers, whether in the form of reciprocating arms or not, can be arranged in at least two sets, wherein when one of the at least two sets is in the first position, the other of the at least two sets is in the second position providing for the contemporaneous pick-up of a first thermoformed workpiece while a previously picked-up first thermoformed workpiece is being assembled to the second thermoformed workpiece.

The trim station can comprise a first punch and die set for trimming the first thermoformed workpiece from the plastic sheet. In this configuration, the die comprises an inlet opening in which the punch is received to trim the first thermoformed workpiece from the plastic sheet when the plastic sheet is positioned between the punch and die, and an outlet opening into which the reciprocating arm extends to pick up the first thermoformed workpiece when the reciprocating arm is in the pick-up position.

A moveable platform can be provided for carrying the reciprocating arm and which is moveable between a first position where the reciprocating arm is positioned within the die outlet, and a second position where the reciprocating arm is positioned outside of the die outlet.

In another aspect, the invention relates to an apparatus for automatically forming a composite article by assembling first and second workpieces thermoformed in a common plastic sheet comprising a plurality of the first and second work pieces, where the assembly station comprises: a trimmer for trimming at least one of the first workpieces from the plastic sheet; and a carrier moveable between a first position, where the carrier picks up one of the first workpieces, and a second position, where the carrier assembles the first workpiece to one of the second workpieces in the plastic sheet.

The carrier preferably moves directly between the first and second positions, eliminating the need to temporarily store the first workpiece prior to assembly to the one of the second workpieces. The carrier preferably assembles the first workpiece to the one of the second workpieces by press-fitting the first and second thermoformed work pieces.

The invention also relates to a method for automatically assembling a first thermoformed workpiece to a second thermoformed workpiece from a plastic sheet comprising a plurality of the first thermoformed workpieces and a plurality of the second thermoformed workpieces to form a composite thermoformed article. The method comprises: trimming at least one of the first thermoformed workpieces from the plastic sheet to form at least one trimmed first thermoformed workpiece; immediately after trimming, carrying the trimmed first thermoformed workpiece to a corresponding second thermoformed workpiece; and assembling the trimmed first thermoformed workpiece to the corresponding second thermoformed workpiece to form a composite thermoformed article.

The assembling of the trimmed first thermoformed workpiece to the corresponding second thermoformed workpiece can comprise one of press-fitting, snap-fitting, bonding, or ultrasonically welding.

The carrying of the trimmed first thermoformed workpiece can comprise picking up the trimmed thermoformed workpiece by suction. The carrying of the trimmed first thermoformed workpiece further can also comprise stopping the suction or overpowering the suction with pressure, at the completion of the assembly of the trimmed first thermoformed workpiece to the corresponding second thermoformed workpiece. The method can additionally comprise limiting the force applied to the trimmed first thermoformed workpiece and the corresponding second thermoformed workpiece as the trimmed first thermoformed workpiece is assembled to the corresponding second thermoformed workpiece.

The trimming step can comprise the trimming of multiple first thermoformed workpieces to form multiple trimmed first thermoformed workpieces, and the assembling step can comprise assembling each of the multiple first thermoformed workpieces to a corresponding second thermoformed workpiece to form multiple composite thermoformed articles.

The trimming can be done by trimming multiple first thermoformed workpieces. The trimming of multiple first thermoformed workpieces can comprise trimming a subset of the total number of first thermoformed workpieces from the plastic sheet. The first thermoformed workpieces forming the subset can be trimmed simultaneously from the plastic sheet. Similarly, the first thermoformed workpieces forming the subset can be simultaneously assembled to corresponding second thermoformed workpieces.

The method can further comprise thermoforming the first and second thermoformed workpieces in a repeating pattern of a predetermined unit. Preferably, the subset is an integer multiple of the predetermined unit. The predetermined unit is one of a row or a column.

The first and second workpieces can be arranged in alternating rows or columns on the plastic sheet. In such a configuration, a preferred sequence of assembly comprises the first thermoformed workpiece being trimmed from one of the alternating rows or columns and assembled onto the second thermoformed workpieces in the adjacent row or column.

The thermoforming can also include the first workpiece being a thermoformed closure tab having first and second projections connected by a flexible strap, the second workpiece being a thermoformed lid having a body recess and a drink opening, wherein the snap-fitting comprises inserting the first projection into the body recess and inserting the second projection into the drink opening.

However the first thermoformed workpieces are assembled to the second thermoformed workpieces, one additional step can include the trimming of the composite thermoformed articles from the plastic sheet.

In a variation, the method for automatically assembling a first thermoformed workpiece to a second thermoformed workpiece from a plastic sheet comprising a plurality of the first thermoformed workpieces and a plurality of the second thermoformed workpieces to form a composite thermoformed article, comprising: trimming at least one of the first thermoformed workpieces from the plastic sheet to form at least one trimmed first thermoformed workpiece; carrying the trimmed first thermoformed workpiece to a corresponding second thermoformed workpiece; and press-fitting the trimmed first thermoformed workpiece to the corresponding second thermoformed workpiece to form a composite thermoformed article.

The method can also comprise the thermoforming of the first and second thermoformed workpieces in the plastic sheet such that one of the first and second workpieces has a projection and the other has a recess, and the press-fitting comprising inserting the projection into the recess. With this configuration, the press-fitting can comprise snap-fitting the projection into the recess. The projection has a portion of greater size than a portion of the recess to effect the snap fit. The first and second thermoformed workpieces can have multiple corresponding pairs of projections and recesses. The method can further comprise thermoforming the sheet from a web of plastic.

DESCRIPTION OF THE PREFERRED EMBODIMENT

Figure 1:
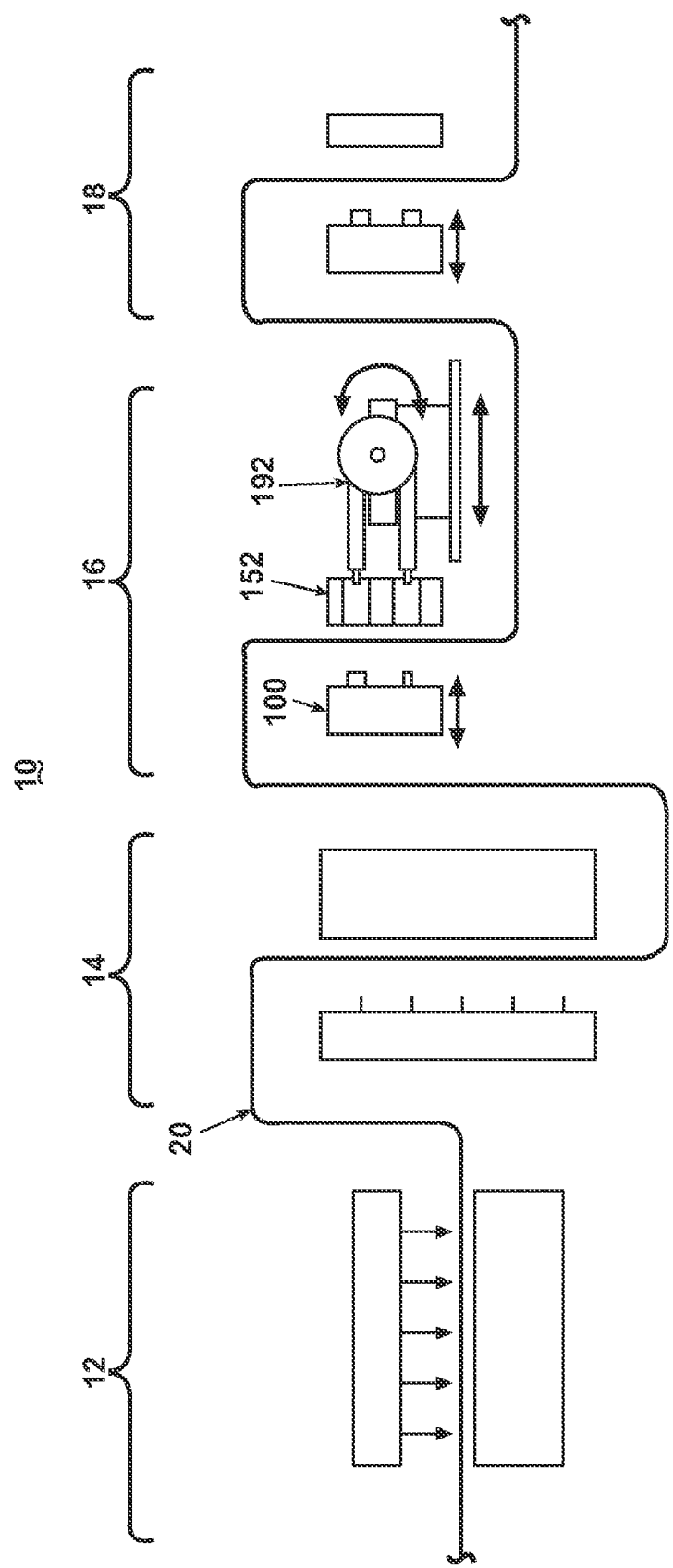
FIG. 1 is a schematic illustration of a first embodiment of a manufacturing line for thermoforming and assembling lids in accordance with the invention and which comprises a thermoforming station, an opening forming station, an assembly station, and a trimming station.

FIG. 1 schematically represents a first embodiment automated lid manufacturing line 10 according to the invention. The lid manufacturing line 10 comprises a thermoforming station 12, an opening forming station 14, an assembly station 16, and a lid trimming station 18 through which a plastic web 20 passes. An overview of the general operation of the lid manufacturing line 10 will be useful in understanding the details of the invention. The thermoforming station 12 forms a tab and lid in the plastic web 20. As the plastic web 20 continues through the various stations of the manufacturing line 10, openings, such as drink openings and vent openings, for example, are punched in the tab closure and lid at the opening forming station 14. The tab is removed from the plastic web 20 and assembled to the lid at the assembly station 16. The lid with the assembled tab is then transferred from the assembly station 16 to the lid trimming station 18, where the assembled lid is trimmed from the web to complete the manufacture of the reclosable lid.

Figure 2:
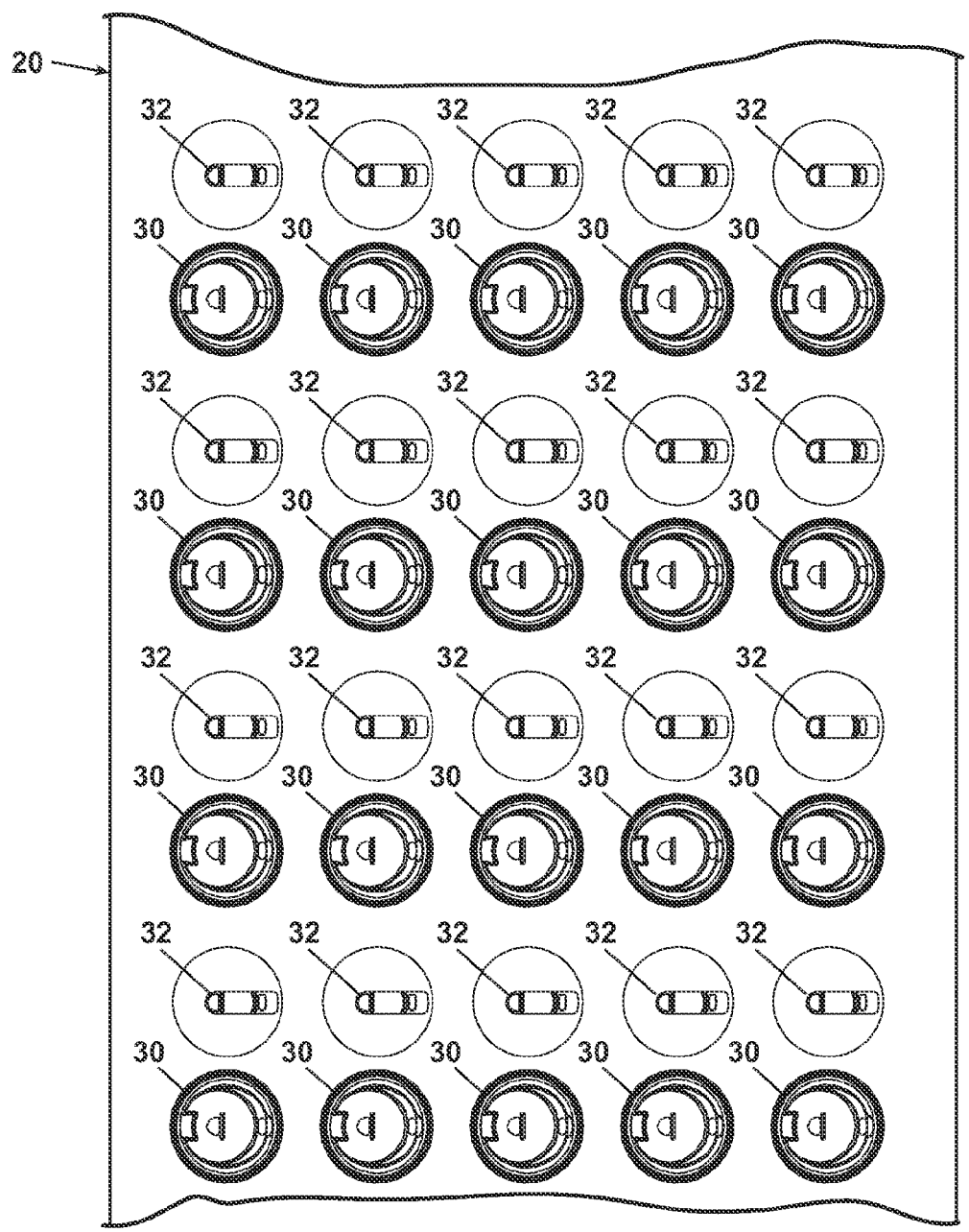
FIG. 2 is a plan view of a portion of a web of thermoformed material containing lids and corresponding tab closures suitable for use in the first embodiment.

FIG. 2 illustrates an example of a portion of a suitable plastic web 20 that has passed through the thermoforming station 12 resulting in lids 30 and tab closures 32 being formed in the plastic web 20 and arranged in alternating and aligned rows comprising five lids and five tab closures. The web is preferably made from a suitable plastic, an example of which is HIPS.

Figure 3:
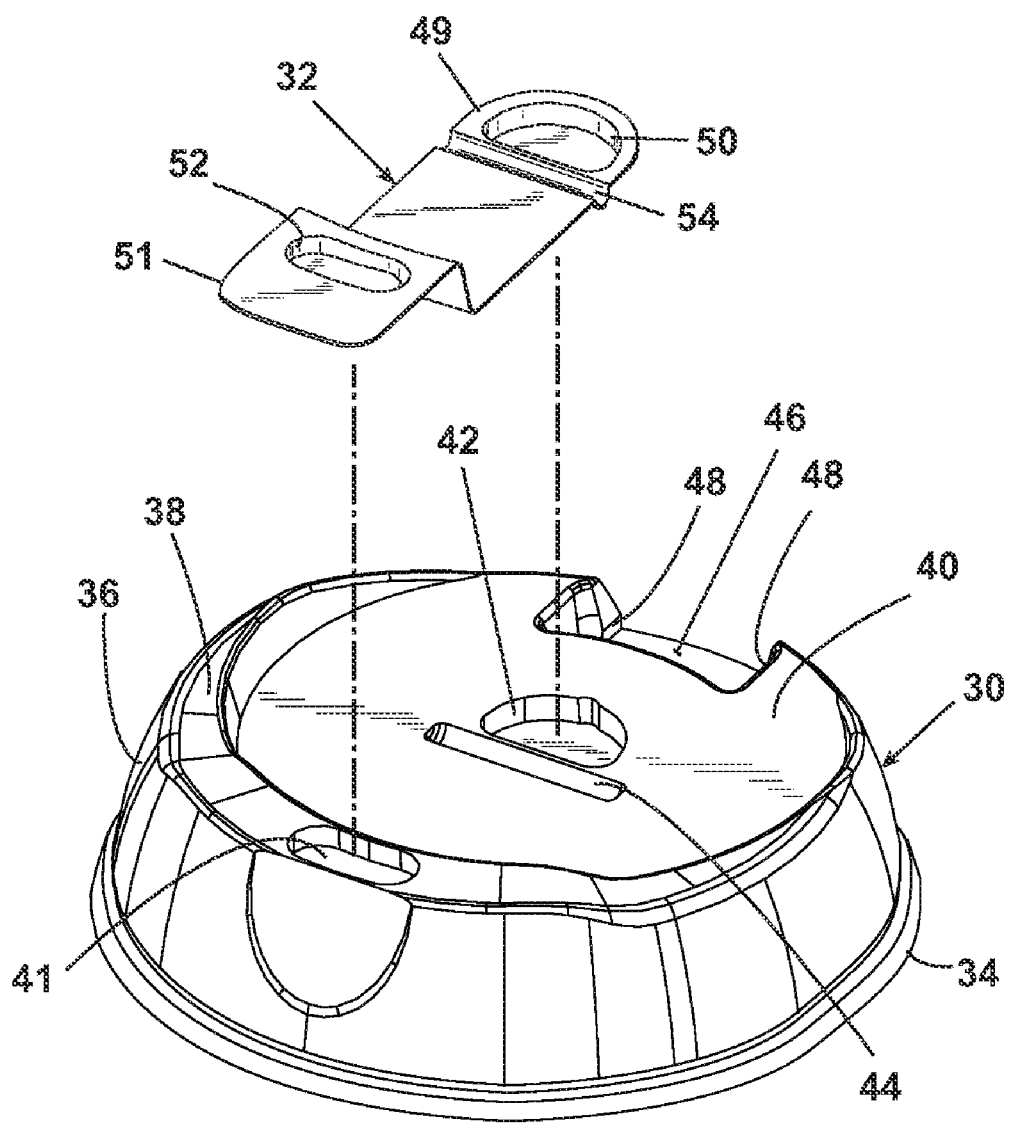
FIG. 3 is a top perspective view of a suitable lid and tab for use in the invention after they have been removed from the web.
Figure 4:
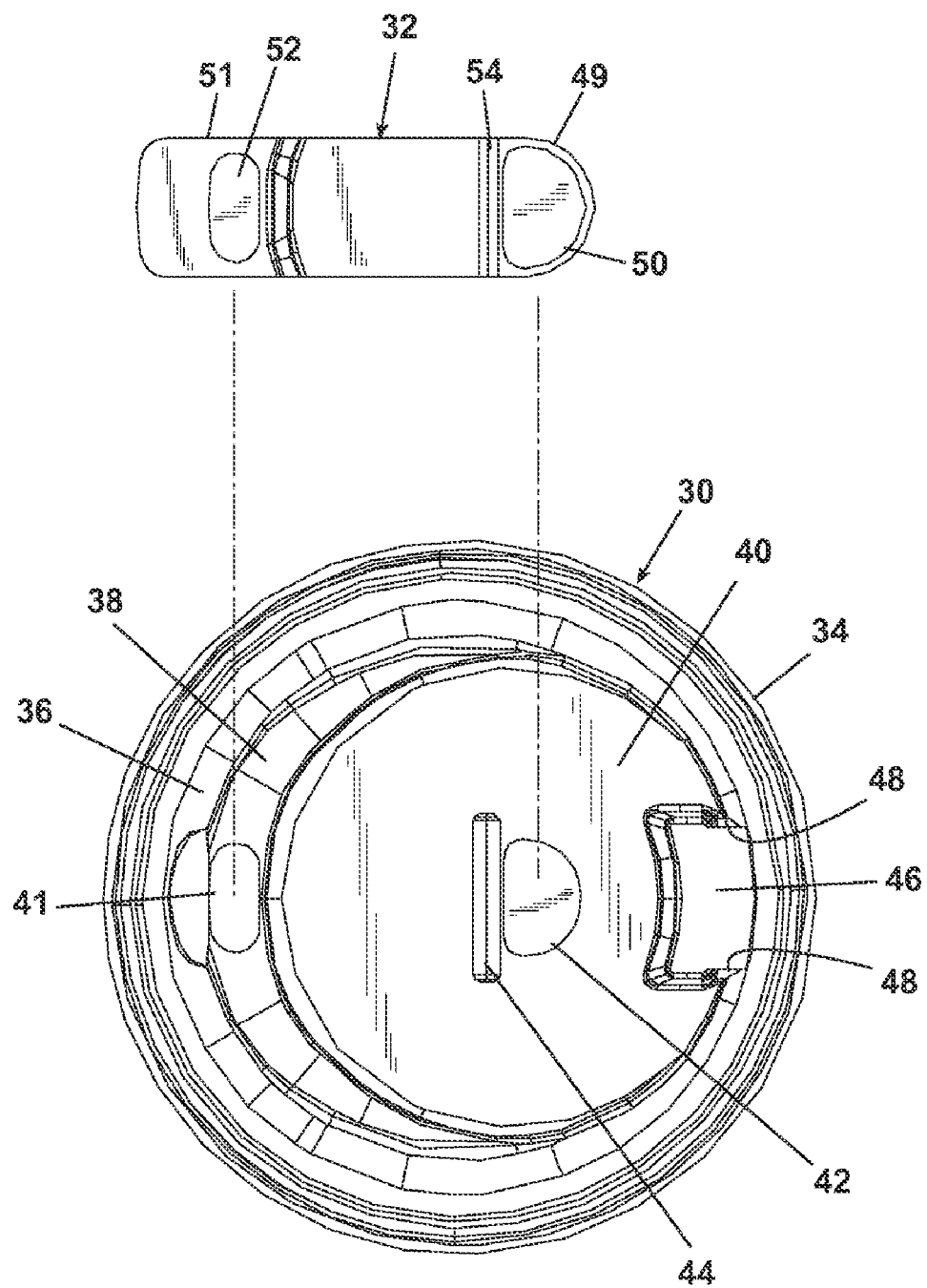
FIG. 4 is a bottom view of the lid and tab of FIG. 3.

An illustrative lid 30 and tab closure 32 are shown in greater detail in FIGS. 3 and 4. The lid 30 comprises a cup mounting ring 34 from which extends a peripheral wall 36, which terminates in an upper surface 38 in which is formed a drink opening recess 41 in the form of a punched-out hole in the bottom of a recessed well. The upper surface 38 of the peripheral wall 36 transitions into a top surface 40, which is generally parallel to the mounting ring 34. A D-shaped well forming a reservoir 42 is formed in the top surface 40 along with a channel 44. A locking recess 46 extends from the top surface 40 and into the peripheral wall 36, where it terminates in opposing inwardly extending fingers 48.

The tab closure 32 comprises a mounting portion 49 including a D-shaped mounting plug 50 and a tab portion 51 including a sealing plug 52. A hinge in the form of a channel 54 is formed adjacent the mounting plug 50 and permits the sealing plug 52 to be pivoted relative to the mounting plug 50. The mounting plug 50 is preferably sized to be pressed into the reservoir 42 of the lid 30. Similarly, the sealing plug 52 is sized to be pressed into the drink opening recess 41.

The affixing of the mounting plug 50 and the sealing plug 52 is preferably accomplished by providing the mounting plug 50, sealing plug 52, reservoir 42, and drink opening recess 41 with a slight draft or taper to their sidewalls. The reservoir 42 and drink opening recess 41 preferably have a negative draft such that the sidewall extends back under the top surface 40 and upper surface 38, respectively. The mounting plug 50 and sealing plug 52 also have a negative draft. It is also preferred that the lower peripheral edge of the mounting plug 50 and sealing plug 52 have a slightly greater periphery than the upper edges of the reservoir 42 and the drink opening recess 41, which in combination with the negative draft, permit the mounting plug 50 and sealing plug 52 to be pressed into the reservoir 42 and drink opening recess 41 to mount the tab closure 32 to the top surface 40 of the lid 30 by snap-fitting a portion of the tab closure 32 into the lid 30.

It should be noted that for purposes of this application the term "press-fit" refers to any type of connection where two parts are connected by at least a portion of one of the parts being received within the other and the resulting interaction between the parts, whether it be frictional, mechanical or another coupling type, results in their coupling, whether it be permanent or temporary. The term "snap-fit" is used to denote a subset of press-fit where there is at least a mechanical coupling.

When the tab closure 32 is mounted to the lid 30, the drink opening recess 41 is selectively opened and closed by the user selectively pulling or pressing on the tab portion 51 to unsnap or snap-fit the sealing plug 52 within the drink opening recess 41. If it is desirable to fix the tab closure 32 in an opened position, the user merely needs to pivot the tab portion 51 about the hinge 54 into the locking recess 46 until the edges of the tab portion 51 pass by the locking fingers 48. The inherent resiliency of the tab closure 32 permits the side edges of the tab portion 51 to deflect beneath the locking fingers 48, which will hold the tab portion 51 in the opened position until unlatched by the user.

It is important to note that the lid 30 and tab closure 32 illustrated in the patent application are only one of any type of lid and tab closure structures that can be assembled according to the invention. The lid 30 and tab closure 32 are therefore merely illustrative and aid in explaining the invention and are not in any manner limiting to the invention.

While the connecting of the tab closure 32 to the lid 30 is described as pressing a portion of the tab closure 32 into a portion of the lid 30, the lid 30 could just as easily be pressed onto the tab closure 32. As a matter of convenience and simplicity, the connection of the tab closure 32 to the lid 30 is described herein as the tab closure 32 being pressed into the lid 30, with it being understood the description just as easily applies to the pressing of the lid 30 onto the tab closure 32.

It should also be noted that the illustrative lid 30 and tab closure 32 are shaped to result in a snap-fit connection. However, the invention is not limited to such a snap-fit connection. Any suitable connection can be used with the invention, for example: press-fit, friction-fit, ultrasonic welding, or adhesion.

The invention is also not limited to assembling tabs to lids. The invention is equally applicable to the assembly of other components and is most suitable for assembling an article comprising multiple pieces formed in a web, at least one of which is removed from the web and assembled to one of the other pieces.

Figure 5:
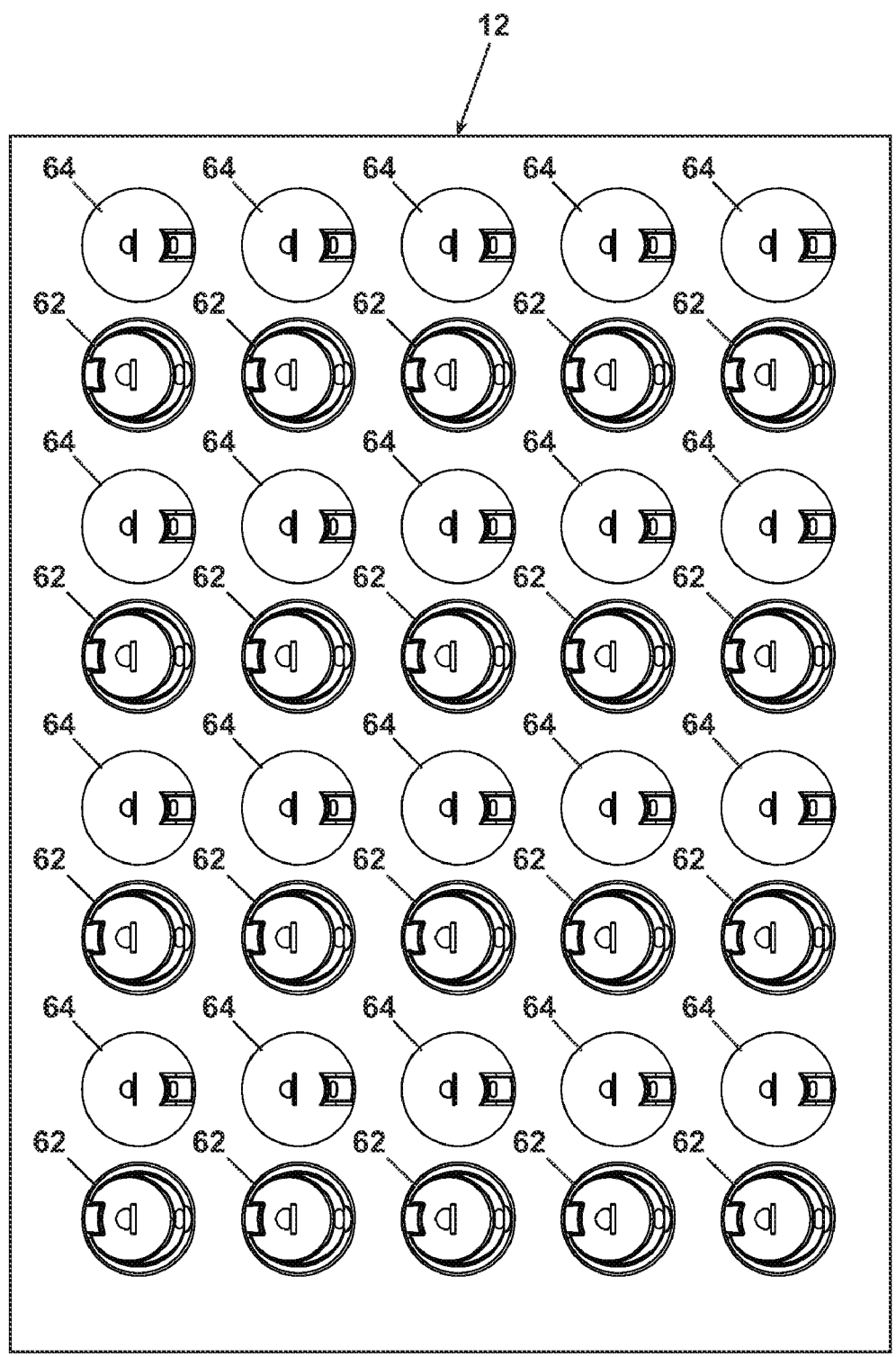
FIG. 5 is a top view of a forming tool for the first embodiment and which is used in the thermoforming station to form the lid and tab closure in the web.

FIG. 5 illustrates a top view of the thermoforming station 12 and multiple lid and tab closure forms 62, 64 about which the web 20 is shaped to form the lids 30 and tab closures 32. The forms 62, 64 are arranged in the same alternating rows as the web 20 of FIG. 2. To form the lids 30 and tab closures 32 in the web 20, the web 20 is heated and laid on top of the forms 62, 64. A vacuum is applied to the lower surface of the web 20 to draw the web 20 against the forms 62, 64, while pressurized air is then imparted to the top of the web 20 to force the web 20 to take the shape of the forms 62, 64. Subsequently, the web 20 is lifted up off the forms 62, 64 and advanced.

The structure and operation of the thermoforming station 12 are generally well known in the art and further description is not necessary. An example of a suitable forming station is an IRAD Model 44 sold by Irwin Research and Development, Yakima, Wash.

It should be noted that the number of forms per row is not limiting on the invention. For purposes of this description five forms are shown for each row. However, any desired number of forms can be used for each row.

Figure 6:
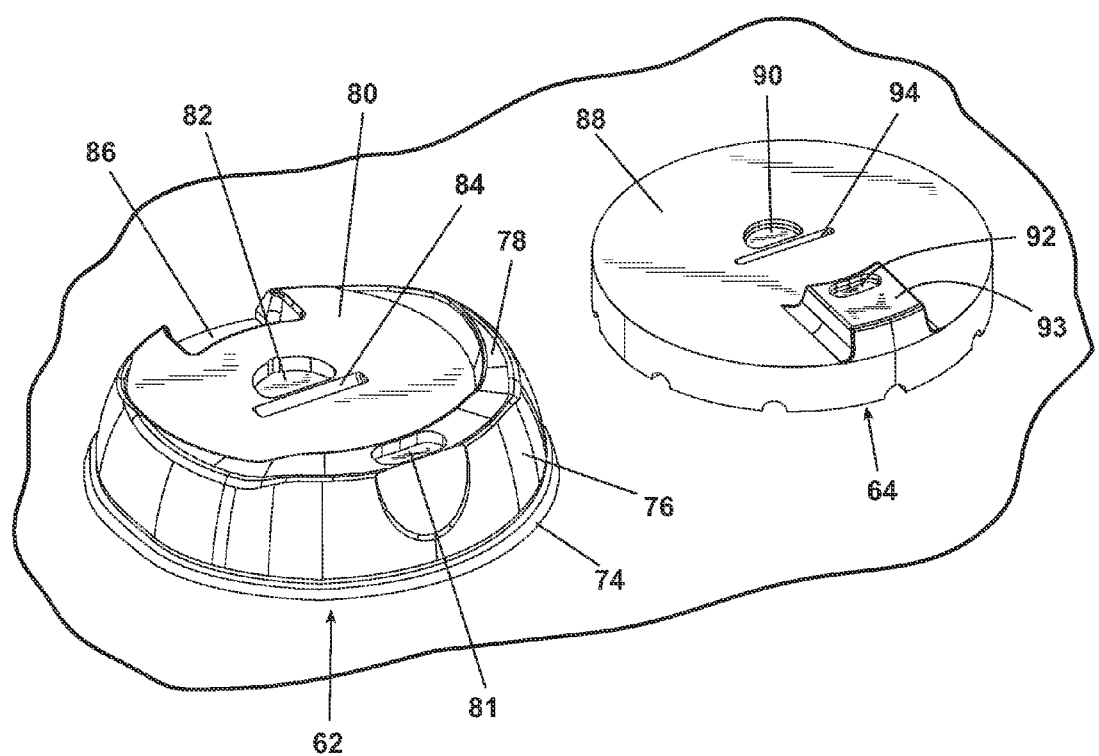
FIG. 6 is a partial perspective view of the forming tool for the lid and tab closure as is shown in FIG. 5.

Referring now to FIG. 6, a corresponding pair of lid and tab closure forms 62, 64 are shown in greater detail. The forms 62, 64 conform to the shape of the lid 30 and tab closure 32 as previously described. Therefore, they will only be briefly described.

The lid form 62 comprises multiple surfaces against which the web 20 is formed. The surfaces include a mounting ring surface 74, a peripheral wall surface 76, a lid form upper surface 78, a top surface 80, a drink opening surface 81, a reservoir surface 82, a channel surface 84, and a locking recess surface 86. Similarly, the tab closure form 64 comprises a raised upper surface 88 in which is formed a mounting plug surface 90, a sealing plug surface 92, and a hinge surface 94. The sealing plug surface 92 is formed in a raised portion 93 whose upper surface will form the tab portion 51. Similarly, the raised upper surface 88 will form the mounting portion 49 once the tab closure 32 is trimmed from the web 20.

Once the lids 30 and tab closures 32 are formed in the web 20, the web 20 is ultimately advanced to the opening forming station 14 where the drink and vent openings are created in the lids 30 and tab closures 32. The opening forming station 14 is well known to one of ordinary skill in the art and will not be described in detail. For purposes of the invention, it is only necessary to understand that the opening forming station 14 removes the material in the drink opening recess 41 to form a drink opening therethrough. Similarly, the opening forming station 14 also creates a vent opening in the bottom of the reservoir 42 and another vent opening in the bottom of the mounting plug 50 to create a vent opening extending through the lid 30 and the tab closure 32 when the tab closure 32 is mounted to the lid 30.

A suitable opening forming station 14 is an IRAD Model 44 sold by Irwin Research and Development, Yakima, Wash., and uses a punch and die structure to create the openings. It is also within the scope of the invention for the openings to be formed by the thermoforming station 12.

FIGS. 7-13 illustrate the details of the assembly station 16 where the tab closures 32 are removed from the web 20 and snap-fitted to the lids 30. Beginning with FIG. 7, the assembly station 16 comprises an assembly to trim the tab closures 32 from the web 20. The trim assembly is in the form of a punch tool assembly 100 from which extends a row of tab punch assemblies 102 for separating the tab closures 32 from the web 20 and a row of lid support assemblies 104 for supporting the lid 30 when the tab closure 32 is mounted to the lid 30.

Figure 7:
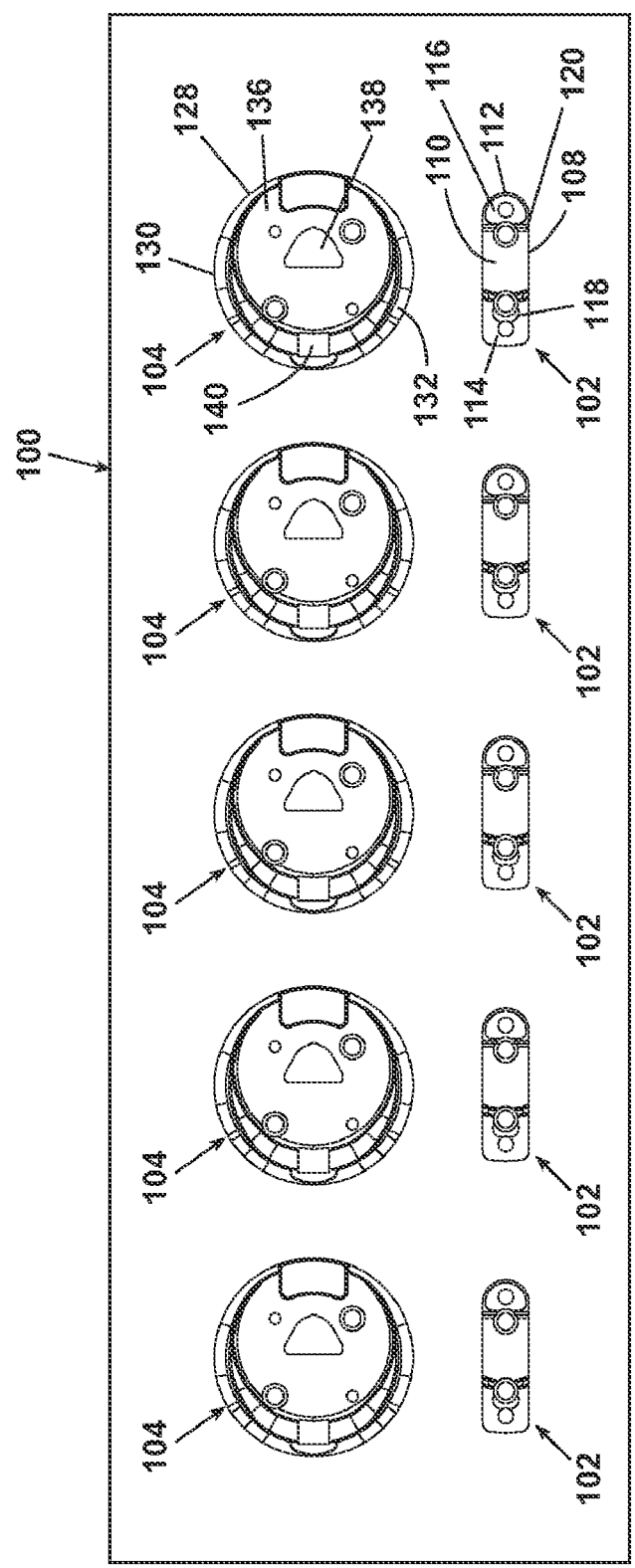
FIG. 7 is a front view of a punch tool assembly for the assembly station of the first embodiment and which is used to punch the tab closure from the thermoformed web and to support the lid as the tab closure is assembled thereto.
Figure 8:
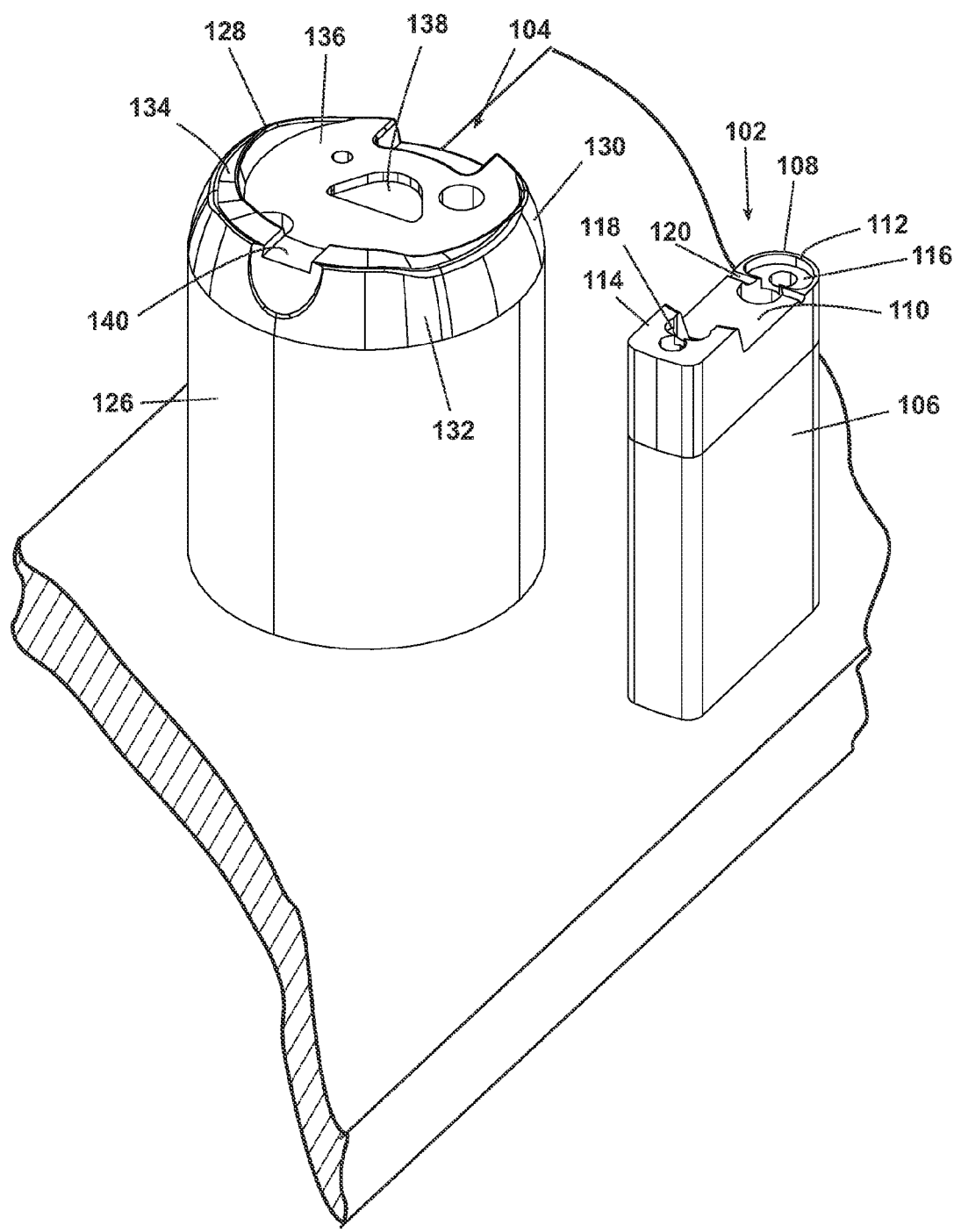
FIG. 8 is a partial perspective view of the punch tool assembly used in the first embodiment and illustrating a punch for punching the tab closure from the thermoformed sheet and a support element for supporting the lid on the thermoformed sheet when the tab is assembled thereto.

Referring to FIGS. 7 and 8, each tab punch assembly 102 comprises a base 106 on which is mounted a tab punch 108. The tab punch 108 has a punch upper surface 110 that conforms to and corresponds to the surface of the tab closure 32 that faces the lid 30. The punch upper surface 110 includes a mounting portion surface 112 and a tab portion surface 114 on which are supported the mounting portion 49 and the tab portion 51, respectively. A mounting plug recess 116, a sealing plug recess 118, and a hinge recess 120 are formed in the punch upper surface 110 and are sized and located to receive the mounting plug 50, sealing plug 52, and hinge 54, respectively, when the punch 108 contacts the web 20 to assure that the mounting plug 50, sealing plug 52, and hinge 54 are not deformed by the punching process.

The lid support assemblies 104 comprise a base 126 on which is mounted a support element 128 having an exterior surface 130 that generally conforms to the inner surface of the lid 30. The exterior surface 130 comprises a peripheral wall support 132, an upper surface support 134, a top surface support 136, a reservoir support 138, and a drink opening support 140. With this structure, the peripheral wall 36, the upper surface 38, and the top surface 40 of the lid 30 are supported along with the reservoir 42 and the drink opening 41 while the mounting plug 50 and sealing plug 52 are snap-fitted within the reservoir 42 and drink opening 41, respectively.

Figure 9:
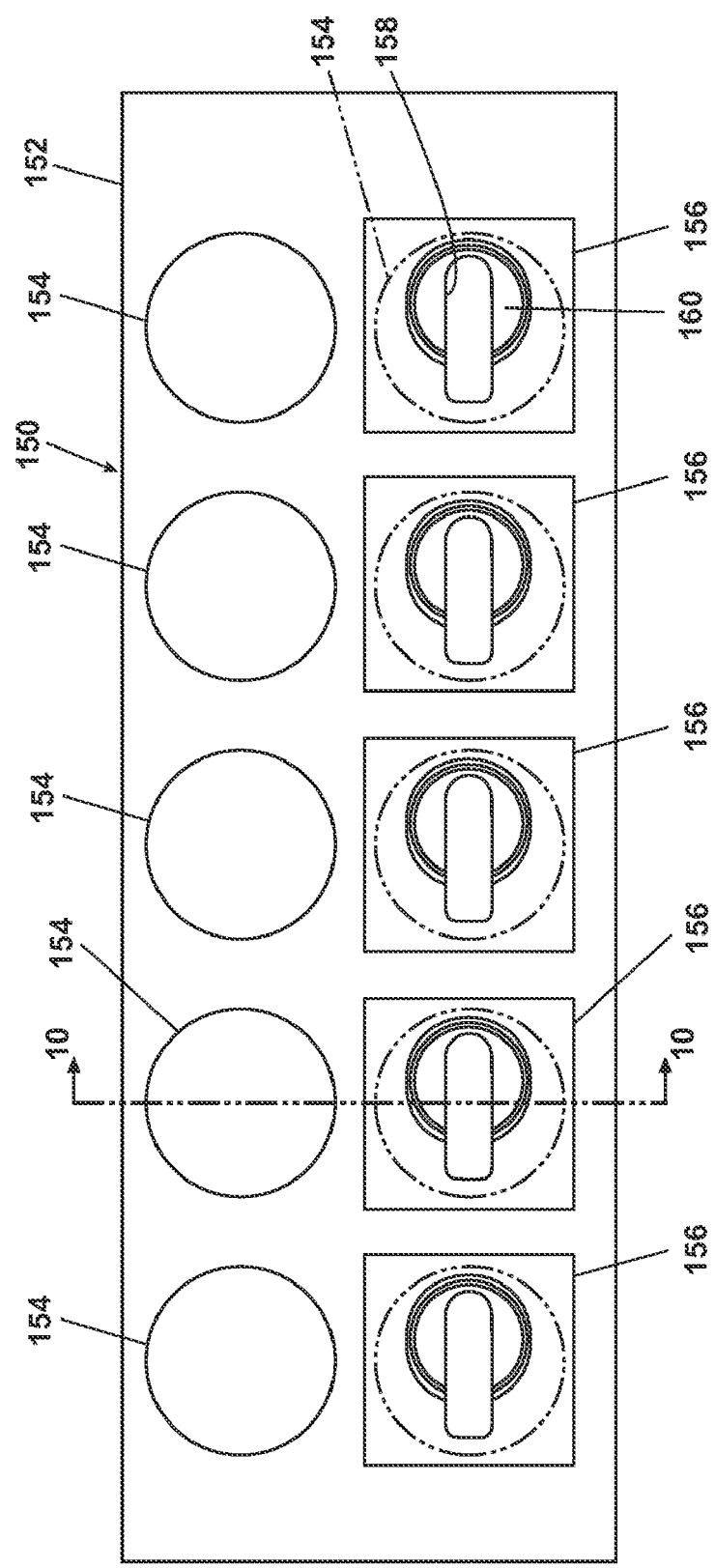
FIG. 9 is a front view of a die assembly for the assembly station of the first embodiment that cooperates with the punch tool assembly of FIGS. 7 and 8 for punching the tab closure from the thermoformed sheet and comprises a row of access openings corresponding to the row of support elements and a row of die openings corresponding to the row of punches.

FIG. 9 illustrates a die assembly 150 that cooperates with the punch tool assembly 100 to trim the tab closures 32 from the web 20 while permitting subsequent mounting of the trimmed tab closures 32 to the lids 30. The die assembly 150 comprises a die shoe 152 in which are formed two rows of access openings 154. The number of access openings 154 in each row corresponds to the number of lids 30 and tab closures 32 in the web 20. A tab die 156 is mounted to the die shoe 152 at each of the openings 154 of the lower row. Each tab die 156 includes a die opening 158 that is sized to receive the tab punch 108 and which is partially surrounded by a support element 160, which functions similar to the support element 128 of the punch tool assembly 100 in that the support element 160 supports the portion of the web 20 surrounding the area from which the tab closure 32 is to be punched.

Although the preferred form of the invention is described in the context of punching one tab closure 32 while affixing an already punched tab closure 32 to a lid 30, additional punch tool assemblies 100, die assemblies 150, and tab assembly mechanisms 190, which will be discussed in detail hereinafter, can be added to provide for the simultaneous punching and assembly of multiple tab closures 32 to multiple lids 30. For example, additional punch tool assemblies 100, die assemblies 150, and tab assembly mechanisms 190 could be added to permit the simultaneous punching and assembly of tab closures 32 for a portion of the web 20 that corresponds to the number of rows of tab closures 32 and lids 30 formed by the thermoforming station 12 in a single forming operation. With such a configuration, the web 20 would be advanced or indexed in sequence with the thermoforming station 12.

Figure 10:
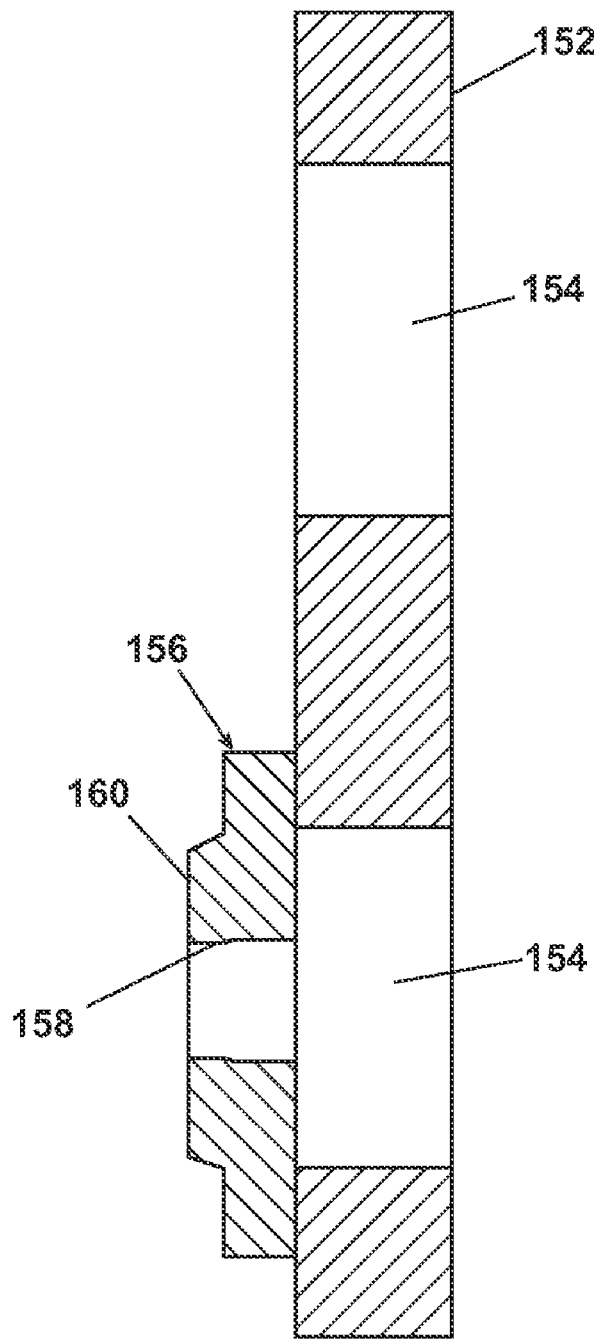
FIG. 10 is a sectional view taken along line 10-10 of FIG. 9 and illustrating a cross section of the access opening and the die opening.

Referring to FIG. 10, the interior shape of the access opening 154 and the die opening 158 are shown. Initially, the die opening 158 has a reduced height as it extends through the support element 160. When the die opening 158 reaches the main portion of the tab die 156, there is a slight increase in the height of the die opening. The die opening 158 then opens into the lower access opening 154 extending through the die shoe 152.

The punch tool assembly 100 is mounted for relative movement to the die assembly 150. When the web 20 is disposed between the punch tool assembly 100 and the die assembly 150, the punches 102 and support elements 104 are aligned to be received within the die opening 158 and the upper row of access openings 154, respectively. Upon movement of the punch tool assembly 100 toward the die assembly 150, the tab punch 108 is received within the die opening 158 to trim the tab closures 32 from the web 20 and the support elements 128 support the back of the lid 30 for assembly of a tab closure 32 onto the lid 30.

The particular manner in which the punch tool assembly 100 is moved relative to the die assembly 150 is not germane to the invention and will not be described in detail. One of ordinary skill in the art will understand that there are many ways in which the movement of the punch tool assembly 100 can be accomplished.

Figure 11:
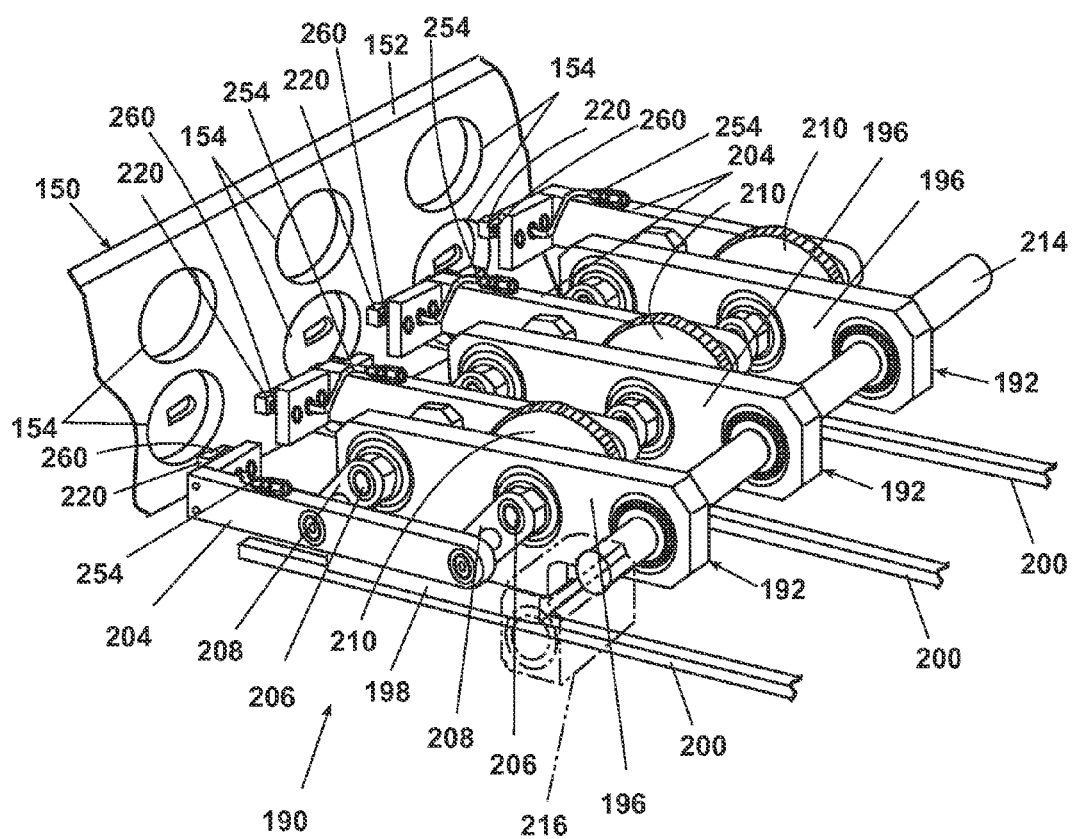
FIG. 11 is a partial perspective view of a tab assembly mechanism for the first embodiment including multiple tab assembly devices, each having reciprocating arms for carrying the tab closure from the web into alignment with the lid.

FIG. 11 illustrates the tab assembly mechanism 190 that functions as a carrier to pick up the punched tab closure 32 and assemble it to the lid 30. The tab assembly mechanism 190 comprises multiple tab assembly devices 192. Although FIG. 11 only illustrates three tab assembly devices 192, a tab assembly device 192 is provided for each column of alternating lids 30 and tab closures 32 on the web 20. Thus, for the web 20, as illustrated, five tab assembly devices 192 would be used.

Figure 12:
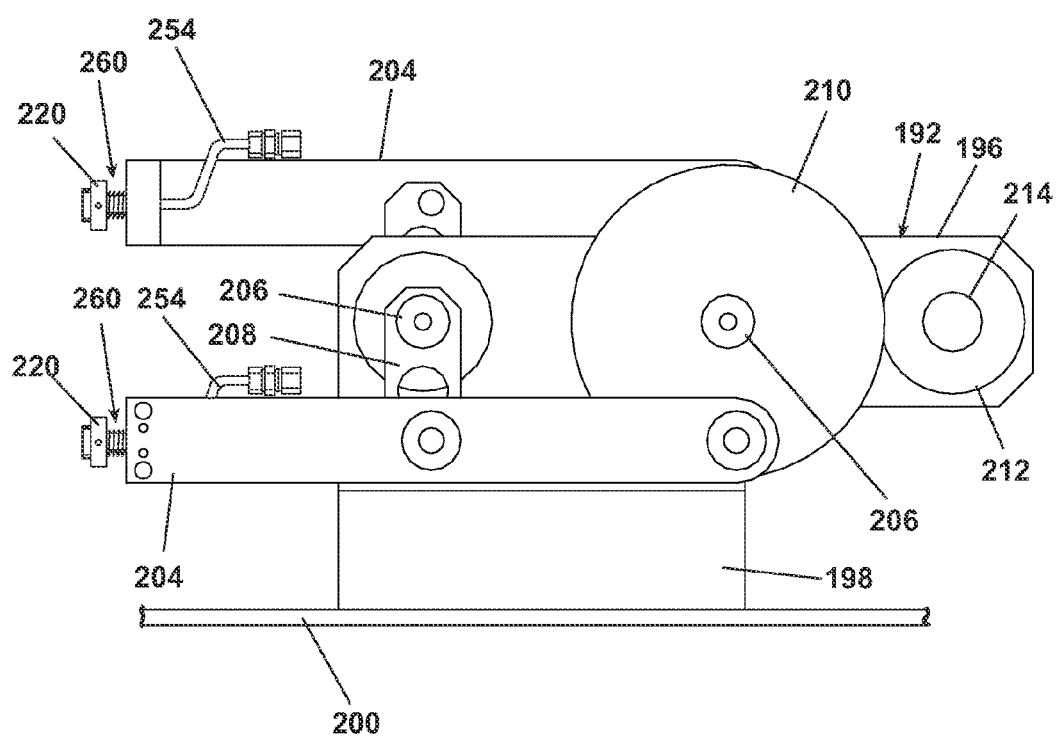
FIG. 12 is a side view of one of the tab assembly devices of FIG. 11 and illustrating the reciprocating arms, each having tab receiver assemblies connected to each end thereof by a force relief device and for selecting a punched tab closure from the thermoformed sheet and assembling the punched tab to the lid.

Referring to FIGS. 11 and 12, each tab assembly device 192 comprises a central beam 196 that is fixedly mounted to a base 198, which is movably mounted on parallel rails 200 for permitting the tab assembly devices 192 to reciprocate relative to the die assembly 150. A pair of receiver arms 204 are connected to common shafts 206, which are journaled in the central beam 196, by crank arms 208. One end of the crank arms 208 is fixedly mounted to the shafts 206 and the other end of the crank arms 208 is pivotally mounted to the receiver arms 204.

A spur gear 210 is mounted to one of the shafts 206 and is used instead of a crank arm 208 to connect one end of one of the receiver arms 204 to the shaft 206. The spur gear 210 is meshed with a drive gear 212 that is mounted to a drive shaft 214 journaled in the end of the central beam 196.

Rotation of the drive shaft 214 thereby simultaneously rotates the drive gears 212 for all of the tab assembly devices 192 and results in the simultaneous rotation of the spur gears 210 to effect the reciprocal movement of the receiver arms 204. Since the receiver arms 204 are connected to the central beam 196 by crank arms 208, the rotation of the spur gear 210 effectively reciprocates the receiver arms 204 between a lower position that is aligned with the die openings 158 and an upper position that is aligned with the upper row of access openings 154. It is preferred that a servomotor 216 (shown in phantom in FIG. 11) is connected to the drive shaft 214 to reciprocally rotate the drive shaft 214 to effect the reciprocation of the receiver arms 204 between the lower and upper positions.

Figure 13:
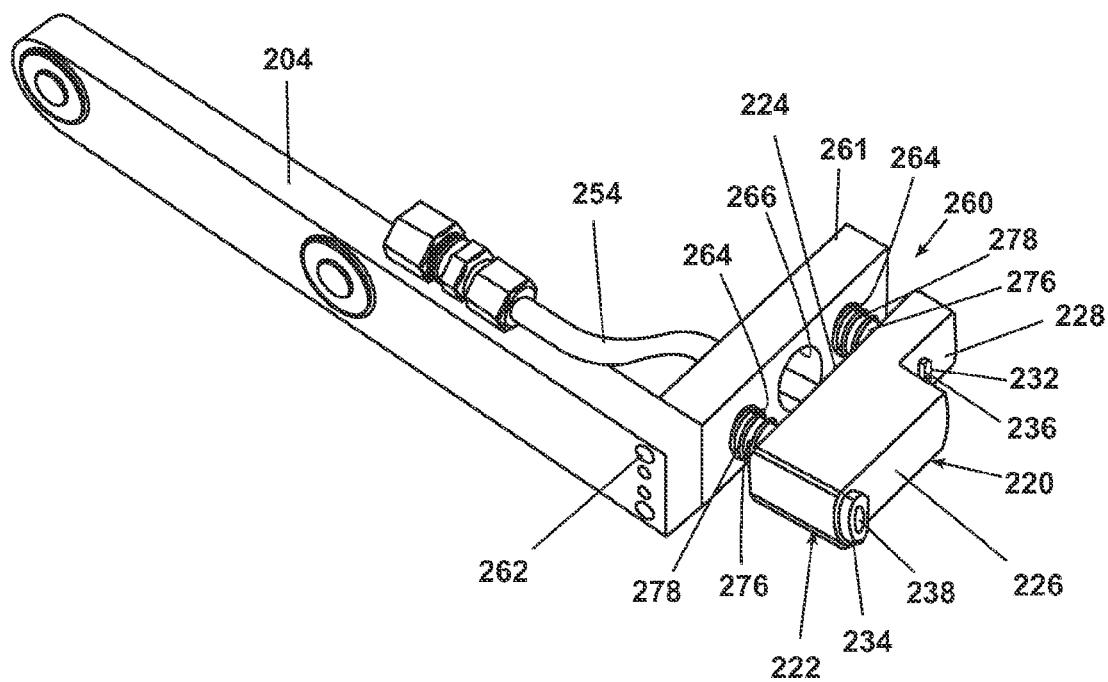
FIG. 13 is a top-front perspective view of one of the reciprocating arms and illustrating in greater detail the connection of the tab receiver assemblies to the arm by the force relief device.
Figure 14:
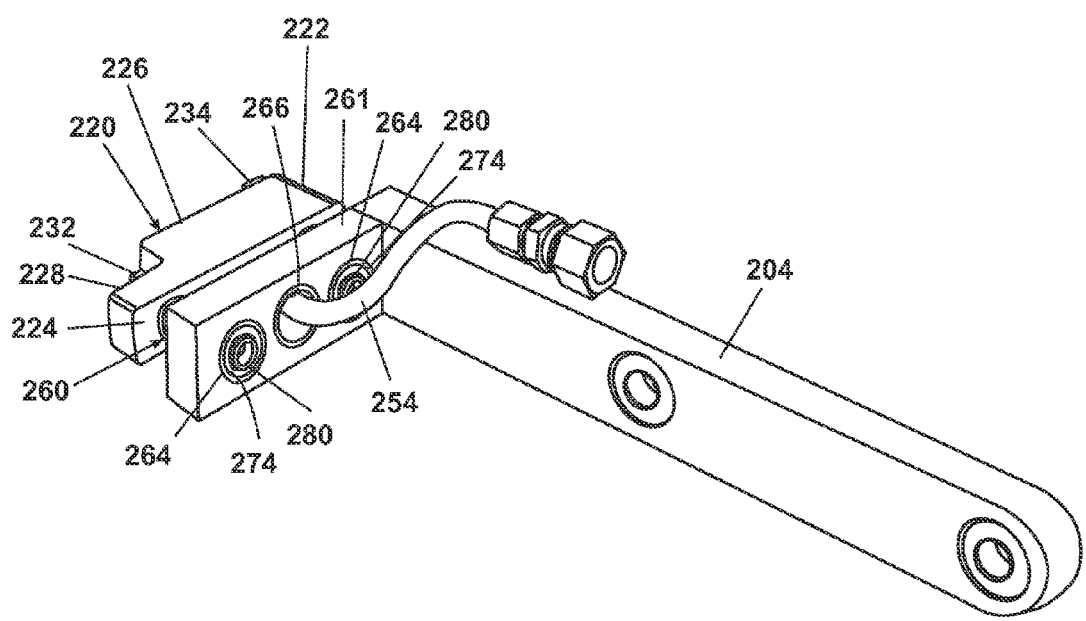
FIG. 14 is a top-rear perspective view of the reciprocating arm of FIG. 13.
Figure 15:
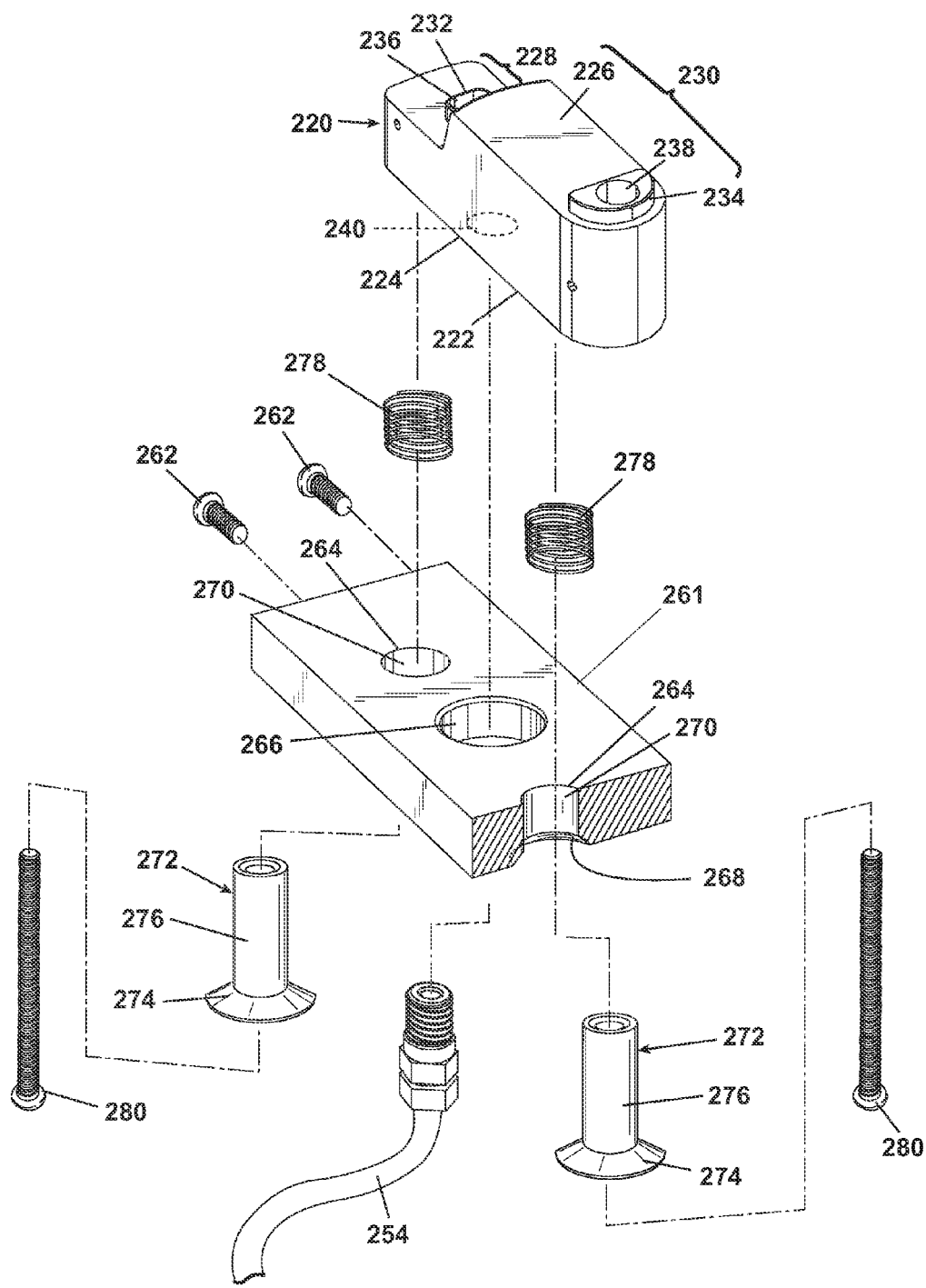
FIG. 15 is a partially sectioned, enlarged perspective view of the tab receiver assemblies and the force relief device of FIGS. 13 and 14.

Referring to FIGS. 13-15 specifically, and FIGS. 11 and 12 generally, a tab receiver 220 is mounted at the very tip of the receiver arm 204 by a force reliever 260, which permits the tab receiver 220 to move relative to the receiver arm 204 if the tab receiver 220 is impacted by a large enough force. Each tab receiver 220 comprises a main body 222 having a lower surface 224 in which is provided a fluid port 240 to which an air line 254 (FIG. 16) is connected. The body 222 also has an upper surface 226 that conforms to the upper surface of the tab closure 32. The upper surface 226 comprises a tab portion 228 that corresponds to the tab portion 51 of the tab closure 32 and a mounting plug portion 230 that corresponds to the mounting portion 49 of the tab closure 32.

A tab suction inlet 232 is located in the tab portion 228 and is shaped to be received within the sealing plug 52 of the tab closure 32. Similarly, a mounting plug suction inlet 234 is located in the mounting portion 230 and is shaped to be received within the mounting plug 50 of the tab closure 32. Each suction inlet 232 and mounting plug inlet 234 comprise air passages 236, 238, respectively, which are piped to the suction port 240 to thereby fluidly couple the air line 254 to the suction inlets 232, 234 for drawing a suction against the mounting plug 50 and sealing plug 52 when the sealing plug 52 and mounting plug 50 are picked up to hold the tab closure 32 against the tab receiver 220. Additionally, air can be injected into the air line 254 and exhausted through the suction ports 232, 234.

The force reliever 260 comprises a platform 261 that is fixedly connected to the receiver arm 204 by screws 262 extending through the arm and into a side edge of the platform 261. The platform 261 comprises spaced guide pin openings 264, between which is provided an air line passage 266 through which the air line 254 passes when it is mounted to the suction port 240. The guide pin openings 264 comprise a frustoconical countersink portion 268 and a constant diameter portion 270.

Mounting pins 272 comprising a frustoconical mounting pin head 274 and a constant diameter shaft 276 are sized to be received within the guide pin openings 264, such that the guide mounting pin heads 274 nest with the countersink portion 268 of the guide pin opening 264 and the ends of the mounting pin shaft 276 extend through the constant diameter portion 270 of the guide pin opening 264 and contact the tab receiver 220. A coil spring 278 is mounted over each shaft 276 and extends between the tab receiver 220 and the platform 261, such that one end of the spring abuts the lower surface 224 of the tab receiver and the other end abuts the platform 261. A screw 280 is received through the mounting pins 272 and threaded into the tab receiver 220 to fix the mounting pins 272 to the tab receiver 220.

The function of the force reliever 260 is to relieve any force imparted to the tab receiver 220 by contact with the tab punch 108 during the punching of the tab closure 32 from the web 20 and the picking up of the punched tab closure 32 by the tab receiver 220. If contact occurs between the tab punch 108 and the tab receiver 220, the springs 278 will compress, and the tab receiver 220 will slide toward the platform 261, thus resulting in the corresponding movement of the shafts 276 within the guide pin openings 264 to relieve the force and prevent damage to the tab receiver 220 and other components of the tab assembly mechanism 190. As the shafts 276 slide relative to the platform 261, the mounting pin heads 274 are unseated from the countersink portion 268 of the guide pin openings 264.

Upon the relative separation between the tab receiver 220 and the tab punch 108, the springs 278 bias the tab receiver 220 away from the platform 261 and return the mounting pins 272 to their prior position. Upon their return, the mounting pin heads 274 nest within the countersink portion 268, which functions to center and align the mounting pins 272 relative to the guide pin openings 264. Additionally, the counter sink portion 268 reduces the likelihood that the shaft 276 will bind as it slides within the constant diameter portion 270.

Figure 16:
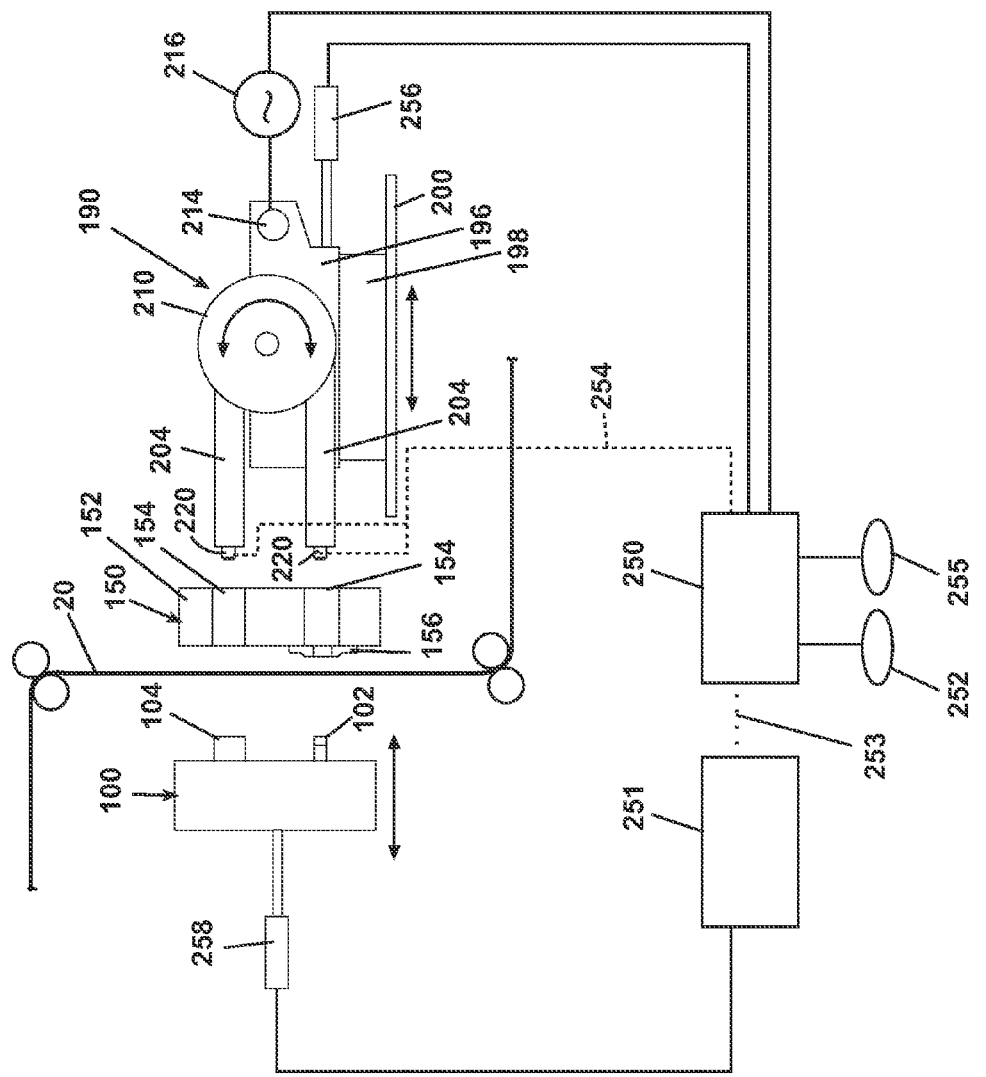
FIG. 16 is a schematic illustrating one possible control scheme for controlling the timing and indexing for the various components of the lid manufacturing line.

FIG. 16 is a schematic representation of one possible method for controlling and synchronizing the various operations of the punch tool assembly 100 and tab assembly mechanism 190 (not shown in FIG. 16), with the rest of the lid manufacturing line 10. It is preferred that two controllers, a tab assembly controller 250 and a tab punch tool controller 251, are provided to operably control the operation and synchronization of the tab assembly mechanism 190 and the punch tool assembly 100, respectively. The tab assembly controller 250 and tab punch tool controller 251 are connected by a data link 253, which permits the transfer of data, such as timing or position data, as need be between the controllers 250, 251.

The tab assembly controller 250 is operably connected to a vacuum source 252 that is connected by air lines 254 to the suction port 240 of each of the tab receivers 220 on the end of the arms 204. The air lines 254 preferably comprise a fitting portion that connects to the tab receiver 220 and a flexible hose portion that connects the fitting portion to the vacuum source 252. The tab assembly controller 250 also connects the air lines 254 to a compressed air supply 255.

Thus, the tab assembly controller 250 is able to control the application of the vacuum or pressurized air to the tab receivers 220 to hold the tab closures 32 after they are trimmed from the web 20 or to blow out any tab closure 32 left in the die assembly 150. The tab assembly controller 250 is also operably coupled to a base actuator 256 for reciprocating the base 198 of the tab assembly mechanism 190 relative to the die shoe 152 of the die assembly 150. The tab assembly controller 250 is further connected to the servomotor 216 to effect the reciprocation of the drive shaft 214 and thereby reciprocate the receiver arms 204 between the lower and upper positions. Thus, the tab assembly controller 250 controls the operation of the various components of the tab assembly mechanism 190 to effect the picking up of a punched tab closure 32, moving the picked up tab closure 32 into alignment with a lid 30, and mounting the tab closure 32 to the lid 30.

The tab punch tool controller 251 is operably coupled to an actuator 258 to reciprocate the punch tool assembly 100 relative to the die shoe 152 of the die assembly 150. The tab punch tool controller 251 also controls the indexing and advancement of the web 20 through the assembly station 16. Thus, the tab punch tool controller 251 controls the advancement of the web 20 to an indexed position where the punch tool assembly 100 is advanced to punch the tab closure 32 from the web 20, where it can then be picked up by the tab assembly mechanism 190.

The type of actuator 256, 258 can be any suitable actuator, such as, for example, hydraulic cylinders, pneumatic cylinders, mechanical drives, and electrical motors. Also, it is within the scope of the invention for the tab assembly mechanism 190 to be mechanically operated, instead of using the servo 216, actuator 256, and even controller 250. Under such an implementation, suitable mechanical connections or linkages can couple the tab assembly mechanism 190 to the punch tool assembly 100, wherein the movement of the punch tool assembly 100 generates the desired synchronized movement of the tab assembly mechanism 190, including both the reciprocation of the base 198 and the arms 204. The vacuum source 252 could be operated by the tab punch tool controller 251 or directly by a position sensor, such as a limit switch.

It is also within the scope of the invention for the multiple controllers 250, 251 to be replaced by a single controller that controls the operation and timing of the various elements of the tab assembly station 10 as need be relative to the plastic web 20 to effect the punching of the tab closure 32 from the plastic web 20, the pickup of the punched tab 32, and the assembly of the punched tab 32 to the lid 30.

Referring to FIGS. 16-19, the operation of the assembly station 16 is generally described. For purposes of the description, it is presumed that the operation is begun when the punch tool assembly 100 is near its back stroke, the upper and lower receiver arms are in the upper and lower positions, respectively, lower receiver arm 204 is not carrying a tab closure 32, and upper receiver arm 204 is currently carrying a tab closure 32 that was picked up in the prior cycle. From this position, the tab punch tool controller 251 continues the steady-state reciprocation of the punch tool assembly 100 and advances the plastic web 20 to index the next rows of lids 30 and tab closures 32 into alignment with the access openings 154. The tab assembly controller 250 then initiates the base actuator 256 to advance the tab assembly mechanism 190 toward the die assembly 150. The rate of advancement of the tab assembly mechanism 190 is greater than the substantially constant stroke rate of the punch tool assembly 100, which is beginning to move forward from its back stroke position toward the die assembly 150.

Figure 18:
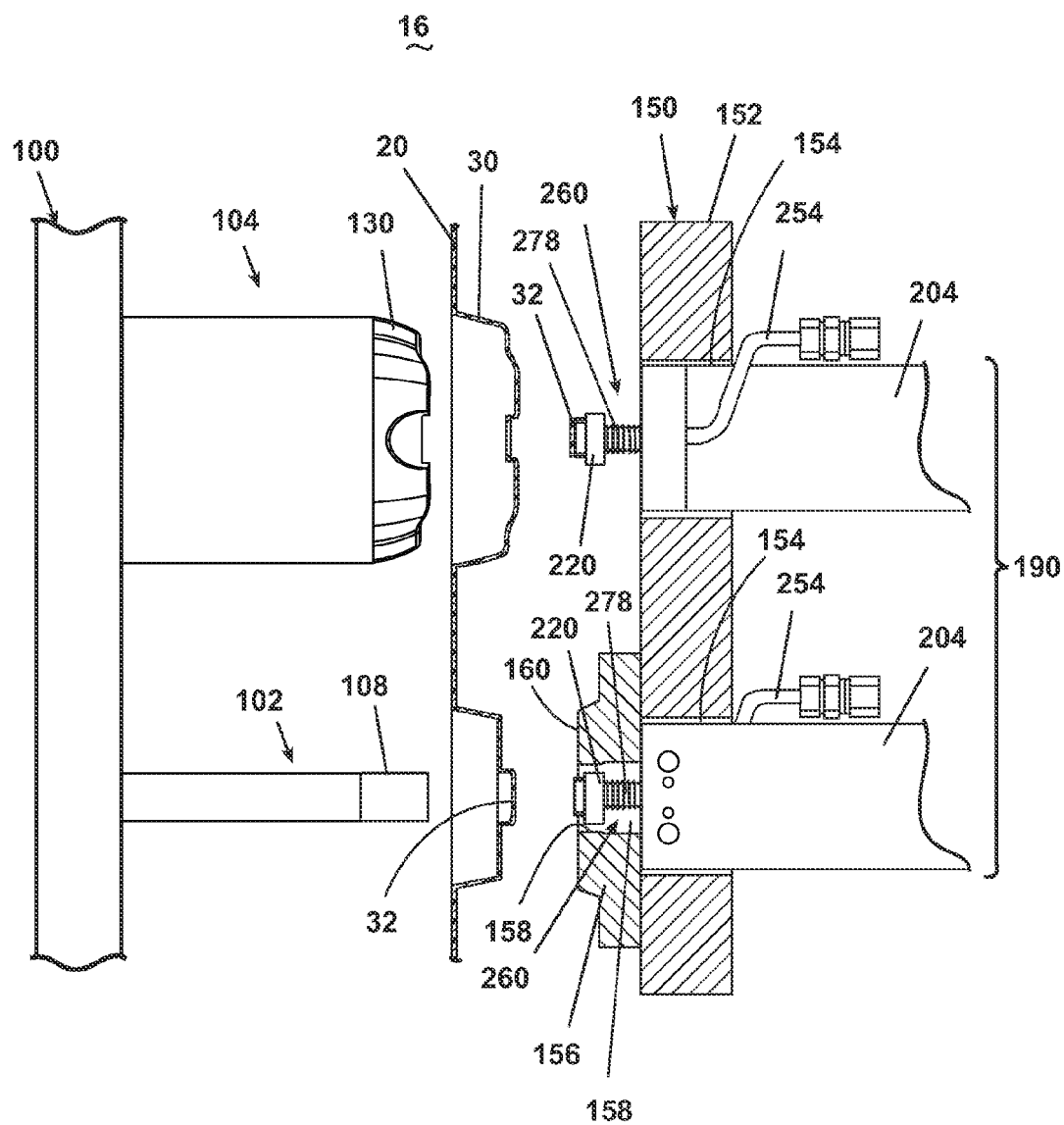
FIG. 18 is a partial sectional view identical to FIG. 17 except the tab assembly device is now advanced to an overstroke position for cleaning out any tab closures that may not have been picked up during the last cycle.

Referring to FIG. 18, the faster speed of the base 198 as it moves on the rails 200 results in the tab receivers 220 extending into and through the die opening 158 beyond the support element 160 into a position that is referred to as an over-stroke position. At this point in the cycle, the tab assembly controller 250 turns on the vacuum source 252. The purpose of the over-stroke position is to ensure that no tab closures 32 were left in the die opening 158 from the prior cycles. If desired, the tab assembly controller 250 can cause a burst of pressurized air to be exhausted from the tab suction inlet 232 and mounting plug inlet 234 to blow out any tab closures 32.

The tab assembly controller 250 then reverses the direction of movement for the base 198 of the tab assembly mechanism 190 to withdraw the tab receivers 220 from the die opening 158 into a standby position. In the standby position, the base 198 of the tab assembly mechanism 190 is preferably stopped on the rails 200 at a position where the tab receivers 220 are located at the furthest insertion depth reached by the tab punch assembly 102 to permit abutting contact between the tab receiver 220 and the tab punch 108 to improve the likelihood of a successful pickup of the tab closure 32 by the tab receiver 220. If, for any reason, the tab receivers 220 are located beyond the forward stroke limit of the tab punch 108, the force reliever 260 will permit the tab receiver 220 to move in response to contact with the tab punch 108 without damage while still permitting the tab receiver 220 to pick up the tab closure 32.

Figure 19:
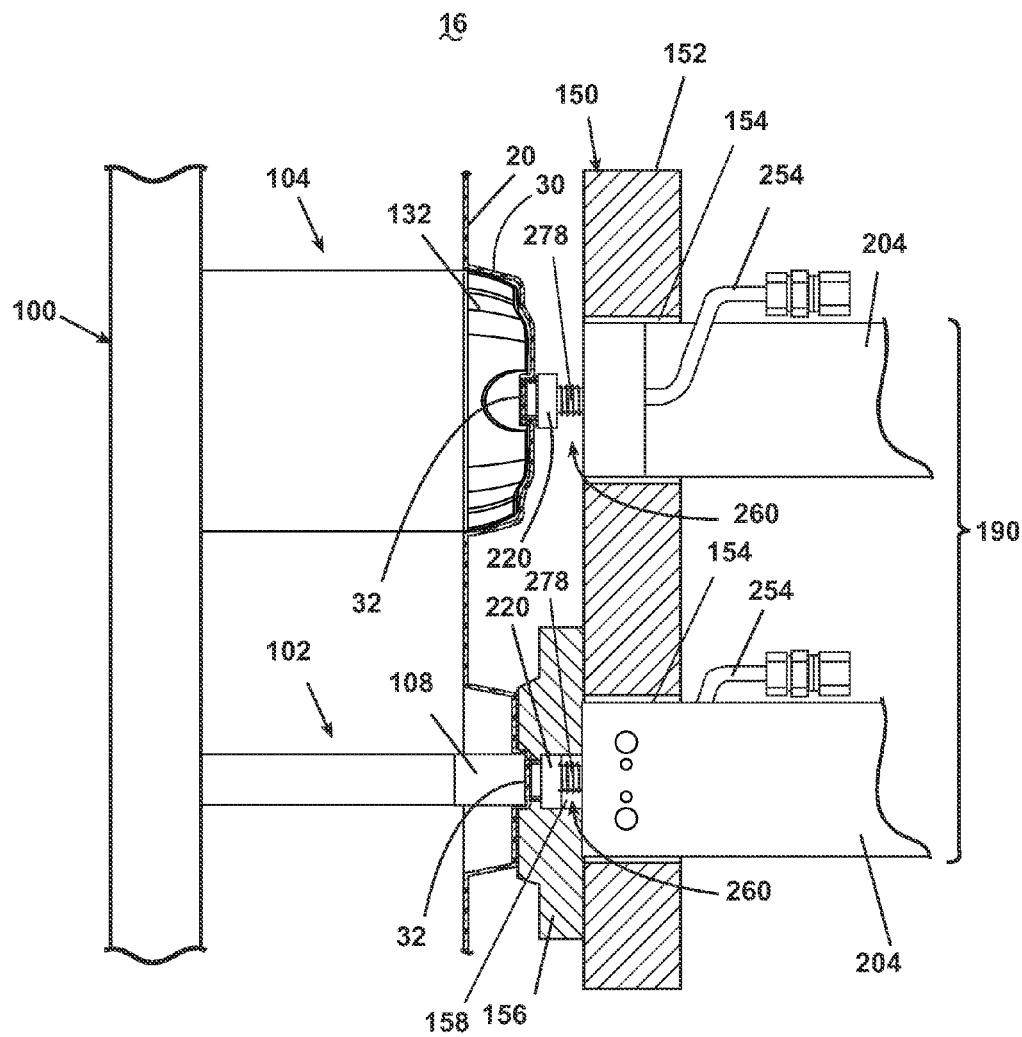
FIG. 19 is a partial sectional view identical to FIGS. 17 and 18 except that the punch tool assembly is shown in a forward stroke limit position where the punch has trimmed a tab closure from the web, and the tab assembly device is shown in an assembly position where the upper arm mounts a tab closure to a lid and the lower arm picks up the trimmed tab closure.

Referring to FIG. 19, with the tab receivers 220 in the standby position, the controller 251 continues the steady advance of the punch tool assembly 100 until the punch tool assembly 100 reaches its forward stroke limit. As the punch tool assembly 100 moves towards the forward stroke limit, the lid support 104 is received within the lid 30, which by now is aligned relative to the upper access opening 154. Similarly, the tab punch assembly 102 initiates contact with the web 20. The continued advancement of the punch tool assembly 100 to its forward stroke limit results in the tab punch assembly 102 extending into the die opening 158 thereby trimming the tab closure 32 from the web 20 while the area surrounding the now-punched tab closure 32 is supported by the support element 160.

As the punch tool assembly 100 reaches its forward stroke limit, the tab receiver 220, with the vacuum on, is awaiting the arrival of the tab closure 32 punched from the web 20. As the tab punch 108 reaches the forward stroke limit, the tab closure 32 is pulled by the vacuum against the tab receiver 220. In addition to the picking up and retaining of the tab closure 32, the advancement of the base 198 of the tab assembly mechanism 190 as the punch tool assembly 100 reaches its forward stroke limit also causes the tab receiver 220 of the receiver arm 204 in the upper position to press the tab closure 32 that it is currently carrying against the lid 30 currently supported by the lid support 104. Since the tab receiver 220 is holding the tab closure 32 such that the mounting plug 50 and sealing plug 52 are aligned with the reservoir 42 and drink opening 41, respectively, the pressing of the tab closure 32 against the lids 30 results in the mounting plug 50 and sealing plug 52 being snap-fit within the reservoir 42 and drink opening 41, respectively, to mount the tab closure 32 to the lid 30, with the tab closure 32 being in the closed position.

An additional benefit of the force reliever 260 is that the tab assembly pressing force can be controlled by selecting the spring force of the springs 278. In other words, the tab receiver 220 carrying the tab closure 32 for mounting to the lid, presses the tab closure 32 against the lid 30. The force used to press the tab closure 32 against the lid 30 can be controlled by selecting the spring force of the springs 278.

Once the punch tool assembly 100 begins moving from the forward stroke limit toward the back stroke limit, the base 198 of the tab assembly mechanism 190 is moved to its back stroke position. As the base 198 is being moved to its back-stroke position, the tab assembly controller 250 initiates the actuation of the servomotor 216 to move the receiver arms 204 from their current position to their opposite position. In other words, the receiver arm 204 currently in the lower position is moved to the upper position and the receiver arm 204 currently in the upper position is moved to the lower position. To avoid any potential contact between the receiver arms 204 and the die shoe 152 of the die assembly 150, the actuation of the servomotor 216 preferably does not occur until the tab receivers 220 are completely withdrawn from the access openings 154 in the die shoe 152.

The punch tool controller 251 preferably continues the steady-state reciprocation of the punch tool assembly 100 while the tab assembly controller 250 continues the syncopated movement of the tab assembly mechanism 190. Thus, the pickup of the tab closure 32 by the tab receiver 220 in the lower position and the snap-fitting of the tab closure 32 to the lids 30 by the tab receiver 220 in the upper position are performed on a continuous basis. This series of steps is continuously repeated as need be as long as the plastic web 20 is supplied to the assembly station 16.

After the tab closures 32 are assembled to the lids 30, the plastic web 20 is advanced to the lid trimming station 18 where the now assembled lid 30 and tab closure 32 combinations are trimmed from the plastic web 20 by a punch and die in a well-known manner, which is similar to the trimming of the tab closure 32 from the plastic web 20. Therefore, the lid trimming station 18 will not be described in detail. A suitable trimming station 18 is an IRAD Model 44 sold by Irwin Research and Development, Yakima, Wash., and uses a punch and die structure to trim the assembled lids 30 from the web 20.

In general, operation of the assembly station 16 can be thought of as a machine-direction assembly process where, as the plastic web 20 is advanced by indexing the web 20 relative to the various stations 12-18, the tab closures 32 are trimmed from one row of a pair of rows comprising a row of tab closures 32 and an adjacent row of lids 30. The trimmed tab closures 32 are mounted to the lids 30 in the next paired rows of tab closures 32 and lids 30. In other words, the trimmed tab closures 32 are not mounted to the lids 30 in the first immediately adjacent row, but are mounted to the lids 30 in the second immediately adjacent row.

While this particular assembly sequence is preferred, it should not be considered limiting on the invention. Other sequences are possible. For example, the tab closures 32 could be mounted to the immediately adjacent row of lids 30 by the tab punch tool controller 251 holding the punch tool assembly 100 at the forward stroke limit while the receiver arm 204 is moved from the lower position to the upper position to mount the tab closures 32 to the lid 30. In such a configuration, the tab assembly device 192 would only need one receiver arm 204. The disadvantage of such an assembly is that it would run slower than the preferred embodiment.

Figure 20:
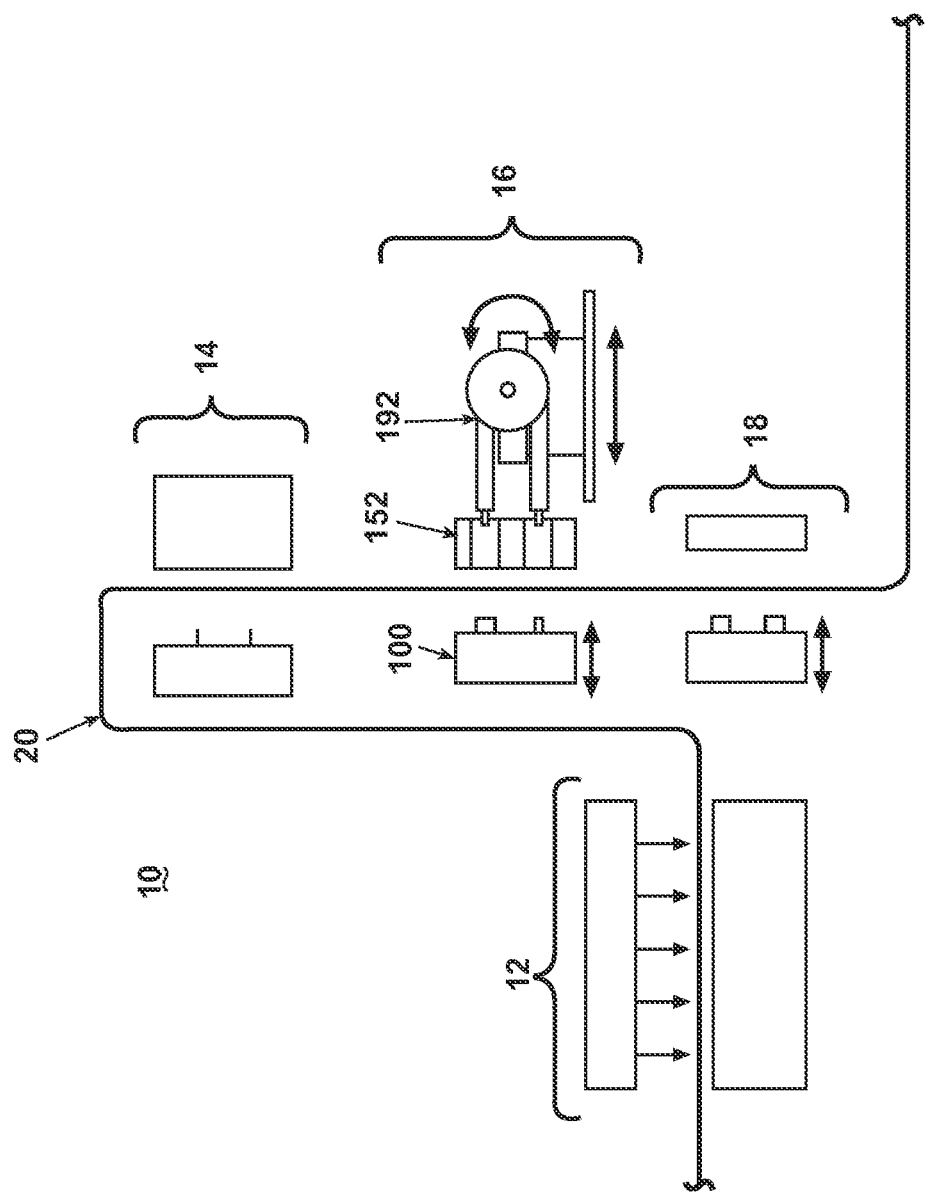
FIG. 20 is an alternative configuration of the manufacturing line shown in FIG. 1, with the opening forming station, the assembly station, and the trimming station all combined into a single station.

Another possible variation is that many of the individual stations 12-18 of the manufacturing line 10 can be combined into a single station. For example, FIG. 20 illustrates a configuration where the opening forming station 14, the assembly station 16, and the lid trimming station 18 are combined into a single station. Since all three of these stations 14-18 typically use a punch and die structure to perform the opening forming, tab closure punching, and lid trimming functions, combining them will not present any insurmountable technical hurdles.

An additional variation worth mentioning is that the tab assembly mechanism 190 could also incorporate an ultrasonic welder that would be used to affix the tab closure 32 to the lid 30. In such a configuration, the tab receiver 220 could still be used to hold and position the tab closure 32 relative to the lid 30 for the ultrasonic welder. In fact, the ultrasonic welder could be incorporated into a portion of the tab receiver 220. Similarly, the tab assembly mechanism 190 could incorporate an adhesive application for gluing the tab closure 32 to the lid 30.

It is also within the scope of the invention for the tab closures 32 to be assembled to the lids 30 in a direction transverse to the machine direction. In such a configuration, the lids 30 and tab closures 32 would be arranged in columns instead of rows as illustrated in FIG. 2. The tab assembly devices 192 would need to be rotated approximately ninety degrees such that their movement between the lower and upper positions would now become a movement between a left and a right position. With this configuration, the tab closure 32 from one column is assembled to the lid 30 in an adjacent column. The disadvantage of this configuration as compared to the first embodiment is that fewer lids 30 can be assembled for a given web 20 width. For most lid manufacturing lines 10, there is a practical limit on the width of the web 20. Therefore, from a production output standpoint, it is more beneficial to assemble as many lids 30 for a given web 20 width as possible.

The stroke sequence and distances are also not limiting. For example, if clogging of the tab closures 32 within the die opening 158 is not an issue, then the tab receivers 220 need not be moved into the over-stroke position. Instead, they can be immediately moved to the standby position.

FIGS. 21-31 illustrate a second embodiment tab assembly line in accordance with the combined assembly station 16 and final trim station 18 shown in FIG. 20 and where the tabs are laterally or horizontally assembled to the lids. Since the substantive differences between the first and second embodiments are found in the assembly station, only the new assembly station will be described in detail, with it being understood that the description of the other stations for the first embodiment are applicable to the second embodiment.

Figure 21:
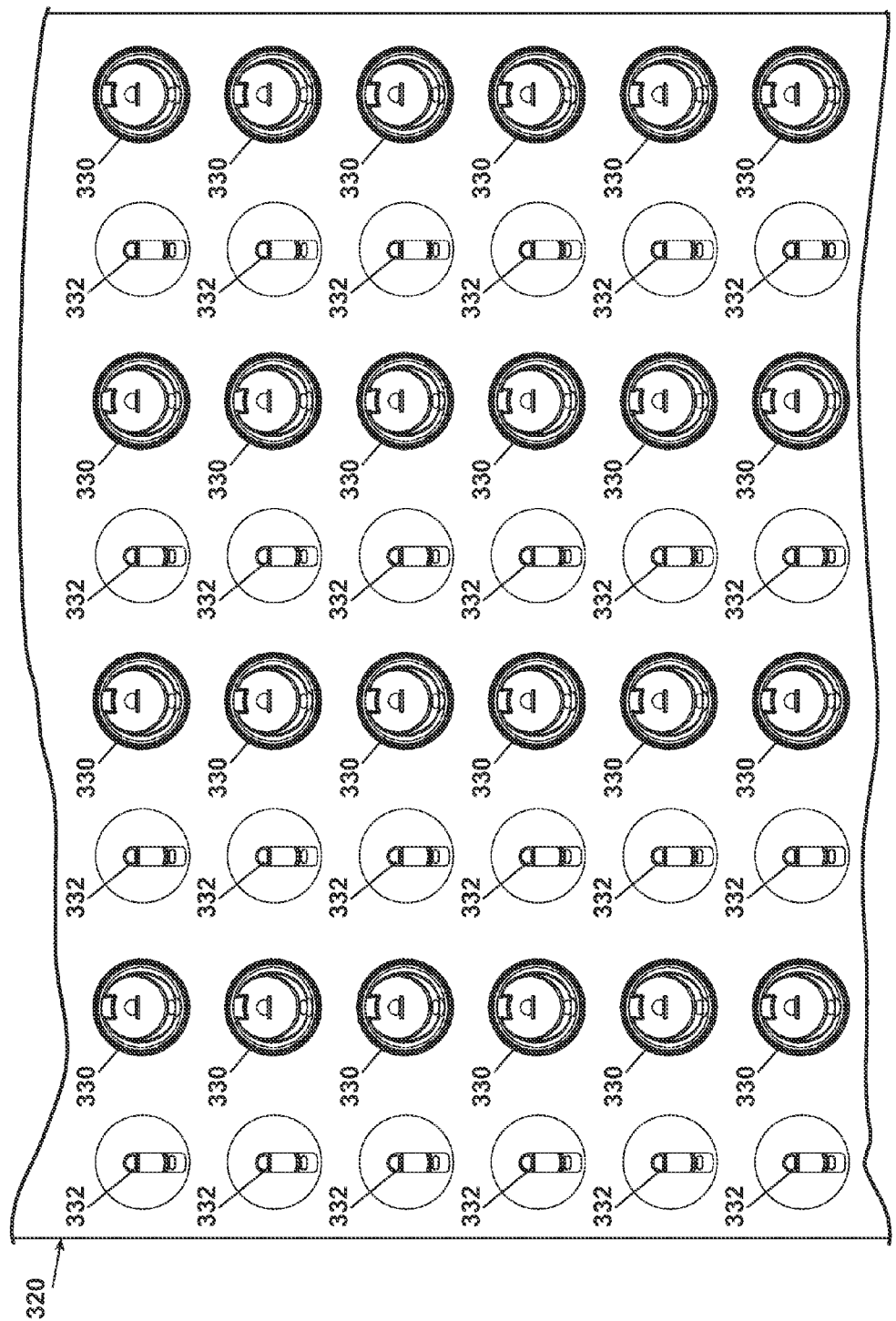
FIG. 21 is a plan view of a portion of a web of thermoformed material containing lids and the corresponding tab closures suitable for use in a second embodiment of the invention.

FIG. 21 illustrates a portion of a plastic web 320 suitable for use with the second embodiment. Lids 330 and tab closures 332 are formed in the plastic web 320 and arranged in alternating and aligned columns comprising four tab columns and four lid columns. The lids 330 are identical to the lids 30 and the tab closures 332 are identical to the tab closures 32 except that they are rotated ninety degrees and arranged into columns instead of rows, which is a function of the horizontal assembly.

As with the first embodiment, the plastic web 320 is preferably made from a suitable plastic, an example of which is HIPS. The lids 330 and the tab closures 332 are formed in a thermoforming station 12 having lid forms and tab closure forms identical to the lid forms 62 and the tab closure forms 64 of the first embodiment, except that the forms 62, 64 are organized into rows and columns in order to form the plastic web 320 shown in FIG. 21.

Figure 22:
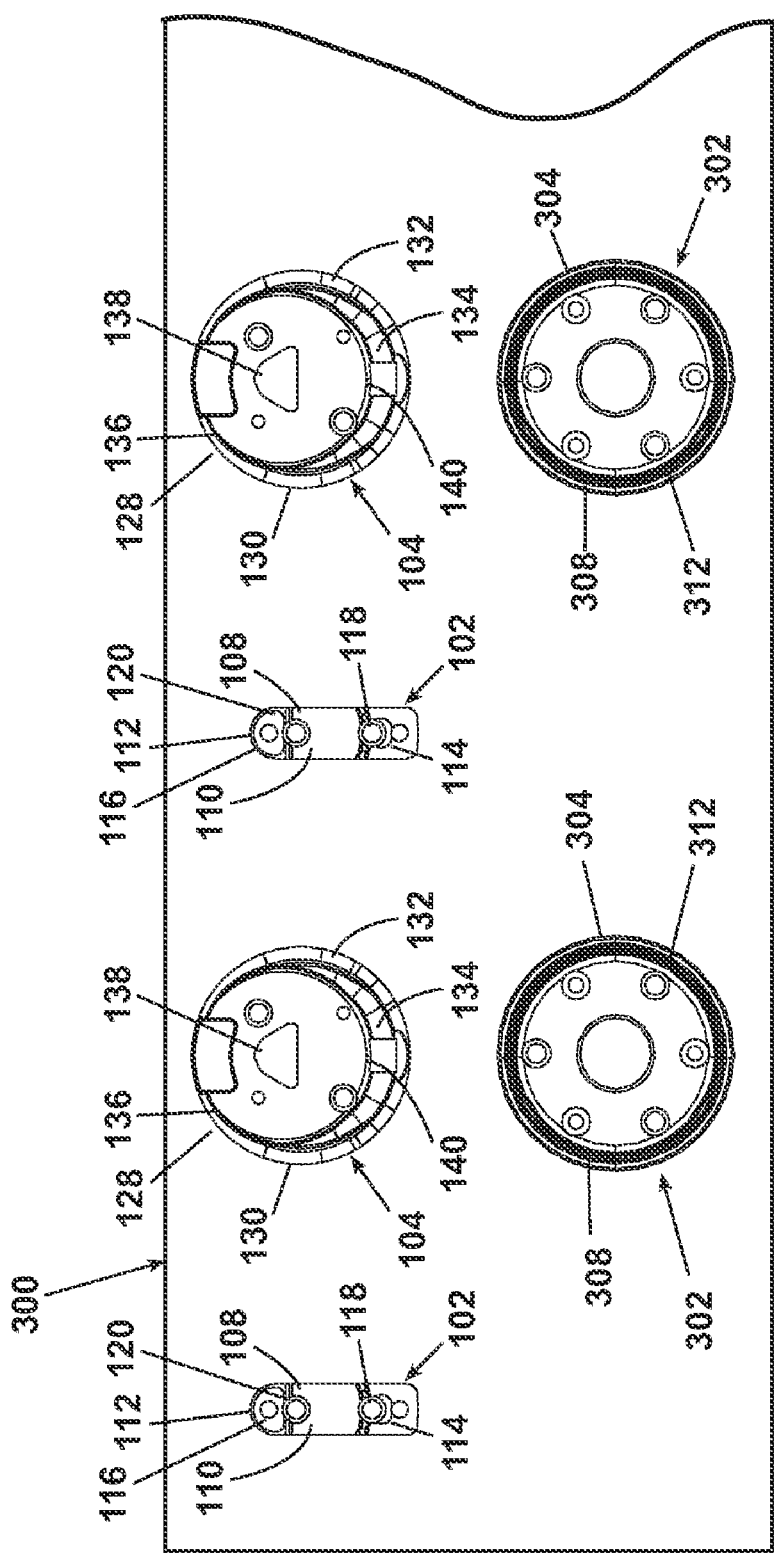
FIG. 22 is a partial front view of the punch tool assembly for the second embodiment having a tab punch used to punch the tab closure from the thermoformed web, a lid support assembly to support the lid as the tab closure is assembled thereto, and a lid punch assembly for punching an assembled lid and tab from the thermoformed sheet.
Figure 23:
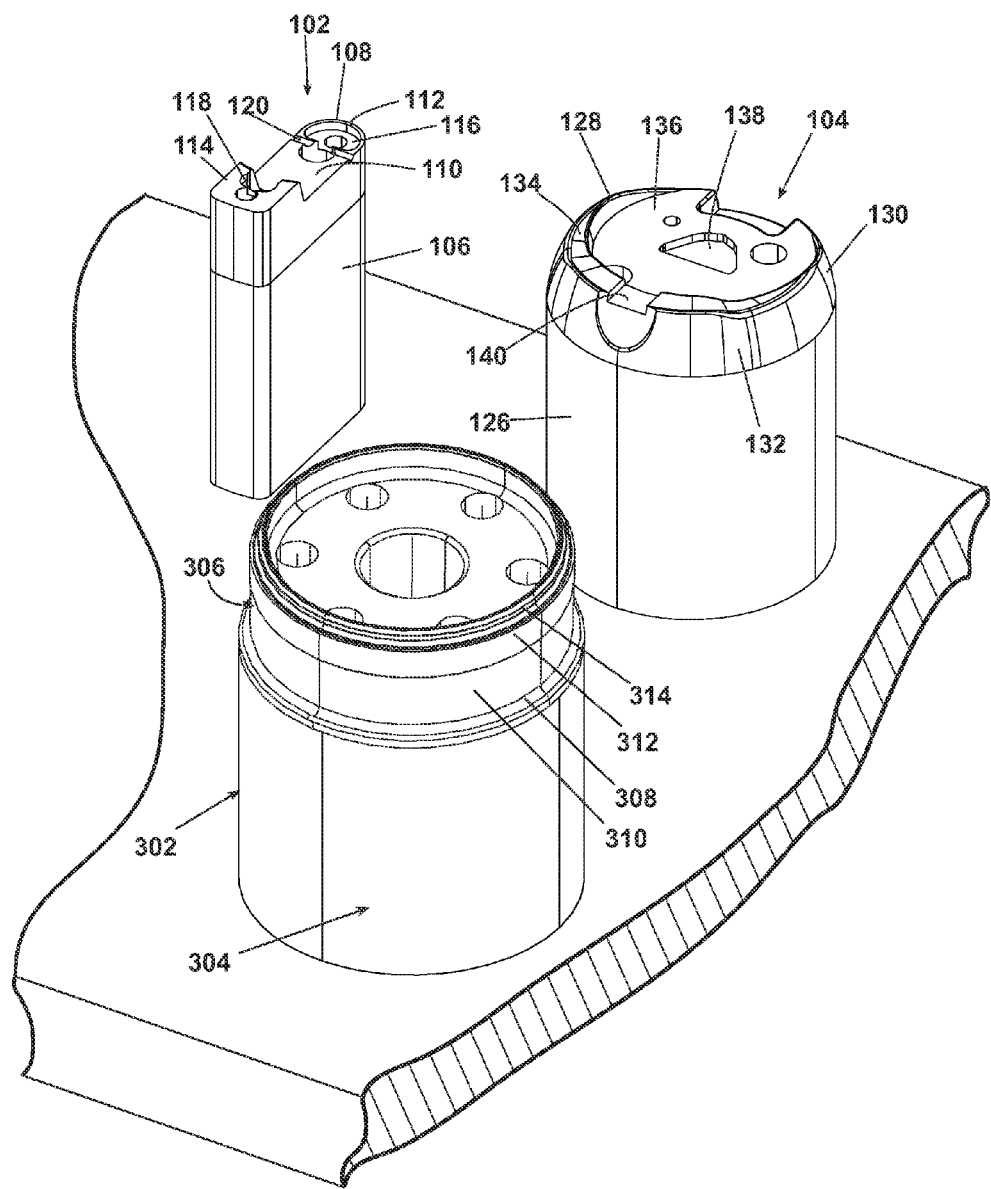
FIG. 23 is a partial perspective view of the punch tool assembly of FIG. 22.

FIGS. 22 and 23 illustrate the details of the second embodiment assembly station wherein the tab closures 332 are removed from the plastic web 320 and mounted to the lids 330. Referring to FIG. 22, the assembly station comprises a trim assembly in the form of a punch tool assembly 300 comprising an upper row formed from alternating tab punch assemblies 102 for separating the tab closures 332 from the plastic web 320, and lid support assemblies 104 for supporting a lid 330 when the tab closure 332 is mounted to the lid 330. The punch tool assembly 300 further comprises a lower row formed from lid punch assemblies 302 for separating a lid 330 with an assembled tab 332 from the plastic web 320. A lid punch assembly 302 is located beneath each of the support assemblies 104.

The punch assemblies 102 and lid support assemblies 104 were described in detail for the first embodiment. The only distinction between the punch assemblies 102 and the lid support assemblies 104 between the first and second embodiments is their rotational orientation and arrangement on the punch tool 300 as preferred to implement the horizontal assembly.

The lid punch assembly 302 is used to trim the lid 330 from the plastic web 320. In the first embodiment, the lid punch assembly 302 would have been located on the first embodiment trimming station 18. The lid punch assembly 302 comprises a generally columnar base 304 on which is mounted a circular lid punch 306. The lid punch 306 comprises an annular mounting ring 308, a neck 310 that supports an annular trim ring 312, and a pilot 314 extending from the trim ring 312.

The lid punch assemblies 302 are vertically aligned with the lid support assemblies 104. The mounting ring 308 abuts the base 304. The pilot 314 is shaped for insertion into the lid 330 and aligns and supports the lid 330 during the trimming process. The trim ring 312 is used to physically trim the lid 330 from the plastic web 320.

Figure 24:
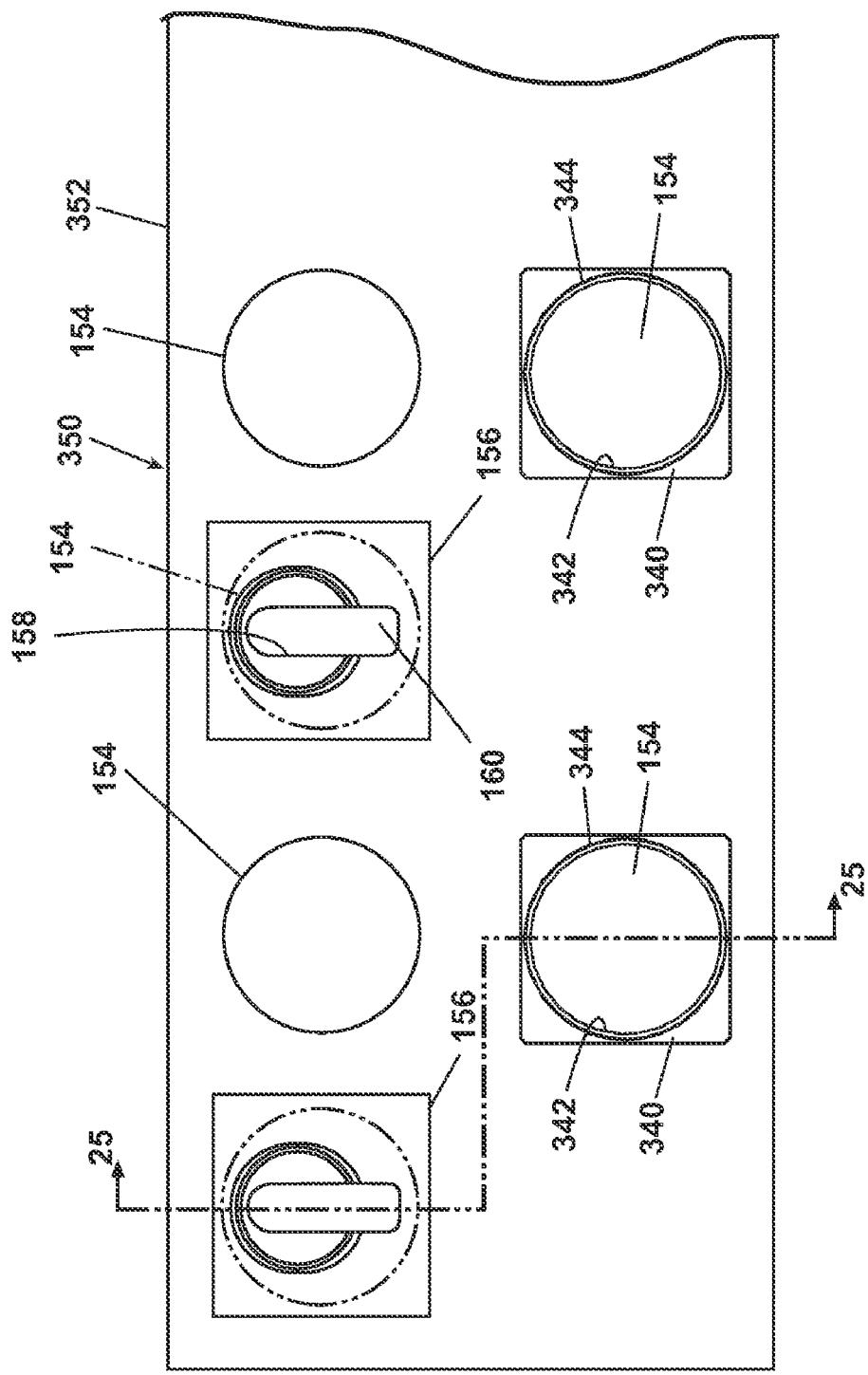
FIG. 24 is a front view of a die shoe for the second embodiment that cooperates with the punch tool assembly of FIGS. 22 and 23 for punching the closure tab and assembled lid from the thermoformed sheet and comprising a first row of alternating access openings corresponding to the row of lid support assemblies and die openings corresponding to the row of tab punches, and a second row of die openings corresponding to the row of lid punch assemblies.
Figure 25:
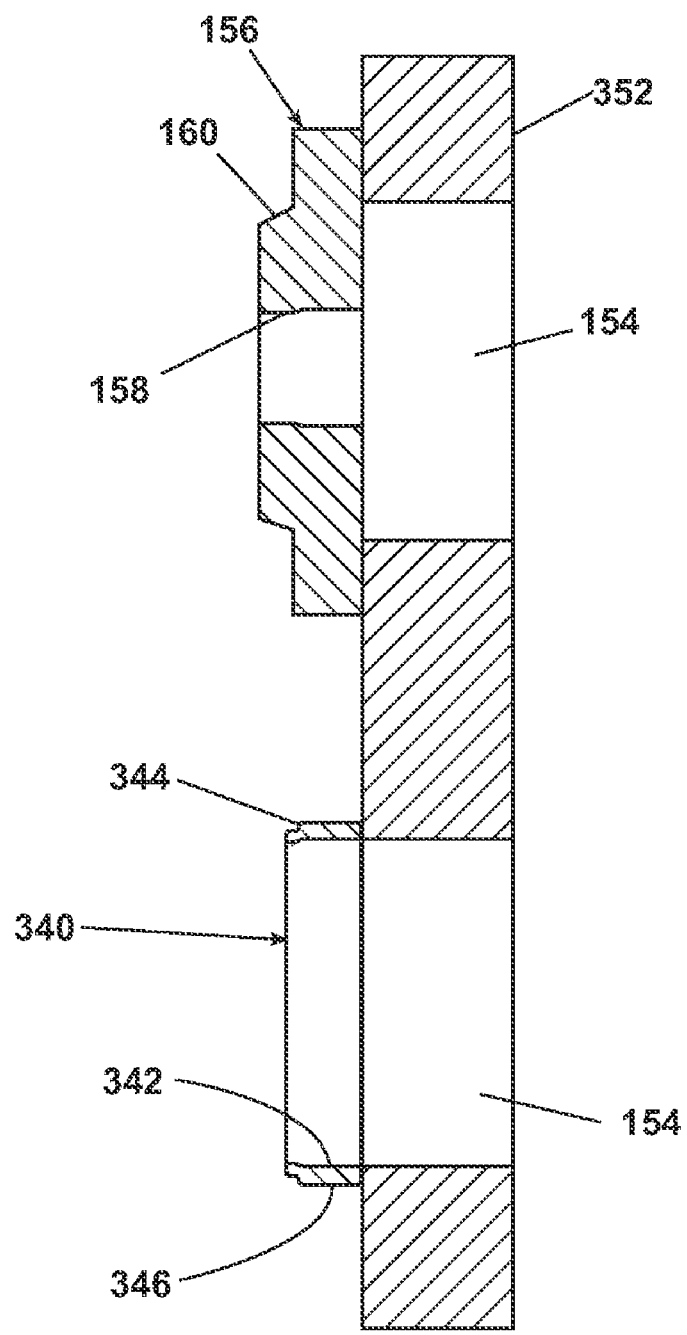
FIG. 25 is a sectional view taken along line 25-25 of FIG. 24 and illustrating a cross section of the die openings.

FIGS. 24 and 25 illustrate a die assembly 350 that cooperates with the punch tool assembly 300 to trim the tab closures 332 from the web 320, mounts the tab closures 332 to the lids 330, and trims the assembled lids 330 from the plastic web 320. The die assembly 350 comprises a die shoe 352 in which are formed a top row of access openings 154 and a bottom row of access openings 154. The number of access openings 154 in the top row at least corresponds to the number of lids 330 and tab closures 332 in each row of the web 320. The number of access openings 154 in the bottom row at least corresponds to the number of assembled lids 330 in each row of the plastic web 320.

A tab die 156 is mounted to the die shoe 352 at alternating access openings 154 of the top row. Thus, the top row comprises a row of alternating access openings 154 without dies 156 and with dies 156. A lid die 340 is mounted to the die shoe 352 at each of the openings 154 of the lower row, which alternates with the tab dies 156 on the top row. Each lid die 340 comprises a main body 346 from which extends a support element 344, which supports the portion of the web 320 surrounding the area from which the assembled lid 330 is to be punched. The lid die 340 includes a die opening 342 that transitions from a first diameter to a larger second diameter at the junction of the support element 344 and body 346. The first diameter is sized to receive the trim ring 312 of punch assembly 302. The larger second diameter aids in removing the trimmed lid 330 from the lid die 340 since the trimmed lid 330 is less likely to get caught in the opening.

The punch tool assembly 300 is mounted for relative movement to the die assembly 350. When the plastic web 320 is disposed between the punch tool assembly 300 and the die assembly 350, the tab punch assemblies 102 and the lid support assembly 104 are aligned to be received within the die openings 158 and the access openings 154, respectively, in the top row of the die assembly 350, and the lid punches 306 are aligned to be received within the die openings 342 in the bottom row of the die assembly 350. Upon movement of the punch tool assembly 300 toward the die assembly 350, the tab punch 108 is received within the die opening 158 to trim the tab closures 332 from the plastic web 320, the lid support assembly 104 supports the back of the lid 330 for assembly of a tab closure 332 onto the lid 330, and the lid punch 306 is received within the die opening 342 to trim the assembled lid 330 from the plastic web 320.

Figure 26:
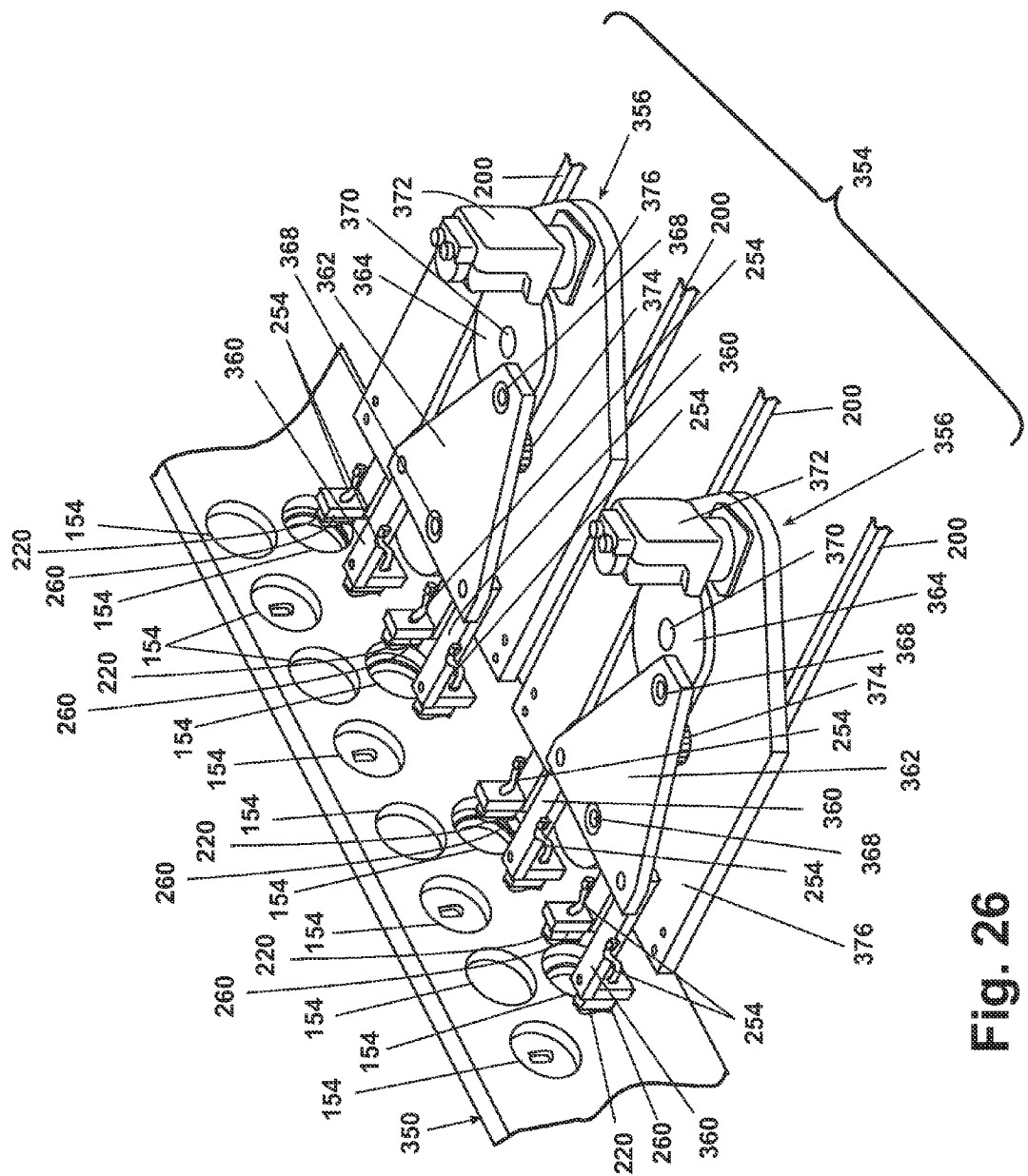
FIG. 26 is a partial perspective view of the tab assembly mechanism for the second embodiment including multiple tab assembly devices, each having reciprocating arms for laterally carrying a tab closure from the web into alignment with a lid.

FIG. 26 illustrates the tab assembly mechanism 354 for the second embodiment used to pick up the separated tab closures 332 and assemble them to the horizontally adjacent lid 330. The tab assembly mechanism 354 comprises two tab assembly devices 356, with each tab assembly device 356 corresponding to two pairs of tab closure 332 and lid 330 columns comprising the plastic web 320. That is, each tab assembly device 356 is designed to pick up two tabs 332 and place each of the tabs 332 on a separate lid 330 in one stroke.

Figure 27:
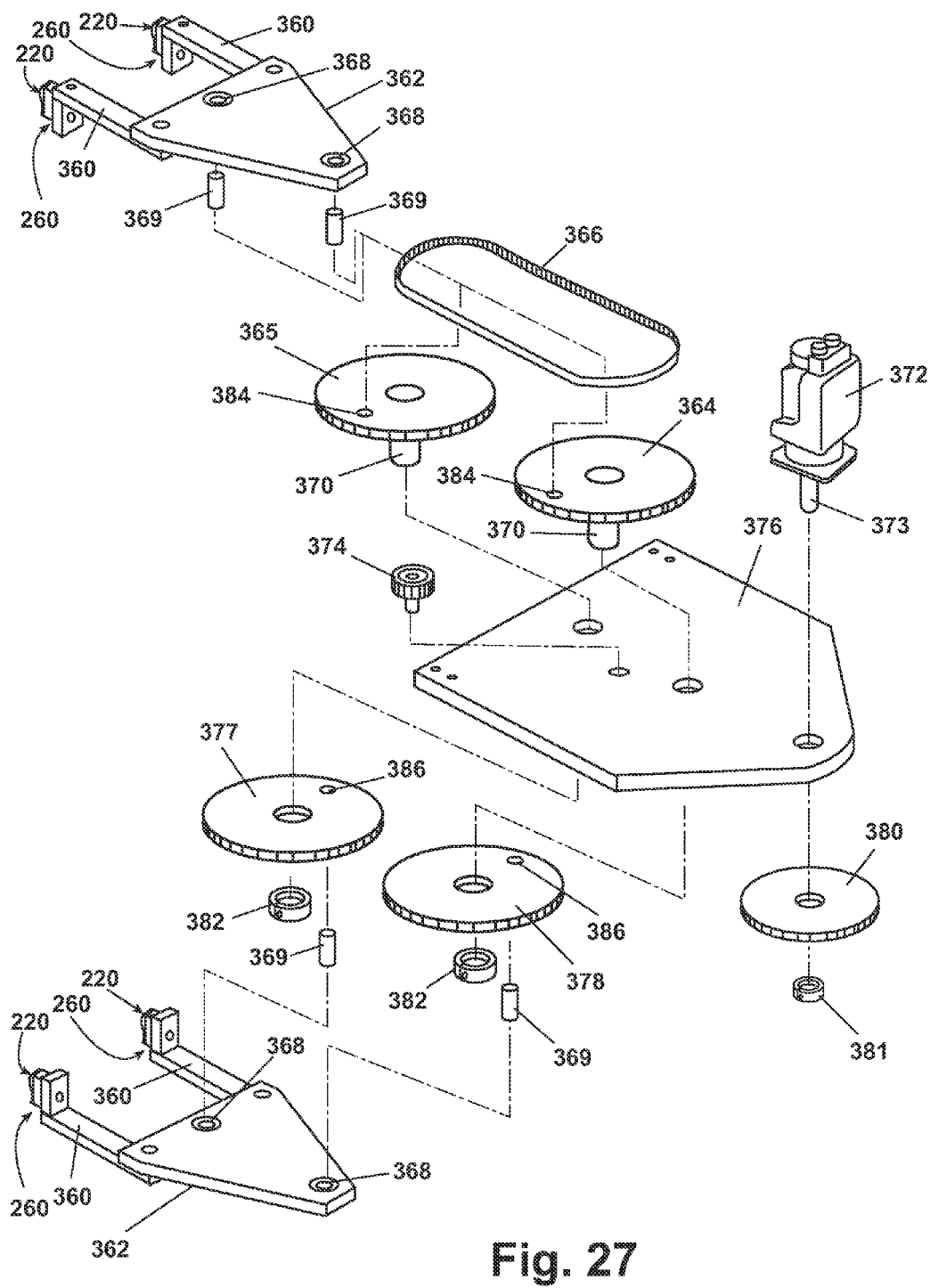
FIG. 27 is an exploded view of one of the tab assembly devices of FIG. 26 showing the reciprocating receiver arms and a drive assembly for moving the arms between the tab die openings and the access openings.
Figure 28:
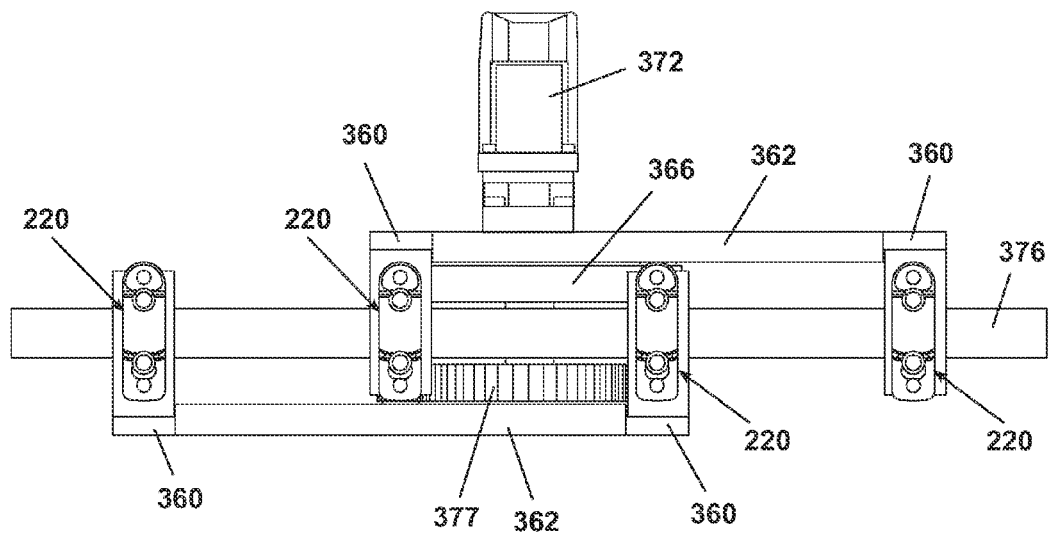
FIG. 28 is a front elevational view of one of the tab assembly devices of FIG. 26 showing the relative operable positions of the reciprocating arms.

Referring now to FIGS. 26-28, each tab assembly device 356 comprises a base frame 376 that is slidably mounted to rails 200 fixedly mounted in the assembly station 16 to permit the tab assembly devices 356 to reciprocate relative to the die assembly 350. The base frame 376 is shown as a generally plate-like structure to which is fixedly mounted a servomotor 372.

A pair of upper plate drive wheels in the form of timing pulleys 364, 365 are attached to axles 370, which are journaled to and extend through the base frame 376, preferably along the longitudinal axis of the base frame 376 in line with the servomotor 372. Lower plate drive wheels in the form of a wheel 377 and a driven gear 378 are fixedly mounted to the axles 370 on the opposite side of the base 376 and secured on the axle 370 with a suitable fastener, shown in FIG. 27 as axle locking collars 382. The wheel 377 is mounted to the axle 370 on which the timing pulley 365 is mounted. The driven gear 378 is mounted to the axle 370 to which the timing pulley 364 is mounted. As so assembled, the upper and lower plate drive wheels 364, 365, 377, 378 rotate in unison with their corresponding axle 370.

A toothed drive gear 380 is fixedly attached to the output shaft 373 of the servomotor 372 by a suitable connector, such as a drive gear locking collar 381, for rotation of the drive gear 380 with rotation of the servomotor 372. The drive gear 380 engages the lower plate driven gear 378 for rotation of the lower plate driven gear 378 in response to the actuation of the servomotor output shaft 373. The rotation of the lower plate driven gear 378 also rotates the upper plate timing pulley 364. A toothed belt 366 connects the upper plate timing pulleys 364, 365 so that rotation of the timing pulley 364 also rotates the timing pulley 365. Since the timing pulley 365 is coupled to the wheel 377, the wheel 377 rotates along with the timing pulley 365. Thus, the rotation of the output shaft 373 rotates all of the upper and lower plate drive wheels 364, 365, 377, 378.

The tab assembly device 356 is also provided with a belt tensioner wheel 374 which is adjustable for maintaining proper tension of the belt 366 around the upper plate timing pulleys 364, 365.

A receiver arm frame 362 is mounted to each pair of the upper and lower plate drive wheels for horizontally reciprocating in a U-shaped path in response to the rotation of the drive wheels 364, 365, 377, 378. The receiver arm frame 362 is a generally plate-like structure having a pair of bearings 368, which receive one end of a pin 369. Each of the upper plate timing pulleys 364, 365 is provided with an upper drive wheel pivot pin hole 384 that fixedly receives the other end of the pin 369. Similarly, a receiver arm frame 362 is also mounted to the lower plate wheel 377 and driven gear 378 with bearings 368 and pins 369. The receiver arm frames 362 are mounted to the upper plate timing pulleys 364, 365 and the lower plate wheel 377 and driven gear 378 at diametrically-opposed juxtaposition so that the upper and lower receiver arm frames 362 have an opposed reciprocal movement.

Attached to the receiver arm frames 362 are a pair of receiver arms 360 having attached tab receivers 220, force relievers 260, and air lines 254 (air lines are not shown in FIG. 27 for clarity) having the same structure and configuration as for the first embodiment. The receiver arms 360 are spaced on the receiver arm frame 362 such that each arm 360 is aligned with an opening 154 in the upper row of the die shoe 352.

It should be noted that while each receiver arm frame 362 is sized to mount two receiver arms 360 to effect the simultaneous pick-up and assembly of two tabs 332, it is within the scope of the invention for each receiver arm frame 362 to mount only one receiver arm 360 or more than two receiver arms 360. It is also within the scope of the invention for multiple receiver arm frames 362 to be mounted to a single base plate 376. Also, the invention can have one, two, or more tab assembly devices 356. The number of receiver arms 360 and tab assembly devices 356 can be adjusted as needed for a given assembly configuration depending on the type and size of product being assembled.

The second embodiment of the tab assembly mechanism 354 operates in a similar manner to the first embodiment, except that as the plastic web 320 moves vertically through the assembly station 16, and the tab closures 332 are picked up from the tab punch assembly 102 and moved horizontally to the lid support assembly 104. Additionally, an assembled lid 330 occupying a lower row in the plastic web 320 is trimmed from the plastic web 320 at the same time that a tab closure 332 in the row above is assembled to a lid 330 and a second tab closure 332 is picked up from the plastic web 320.

Figure 29:
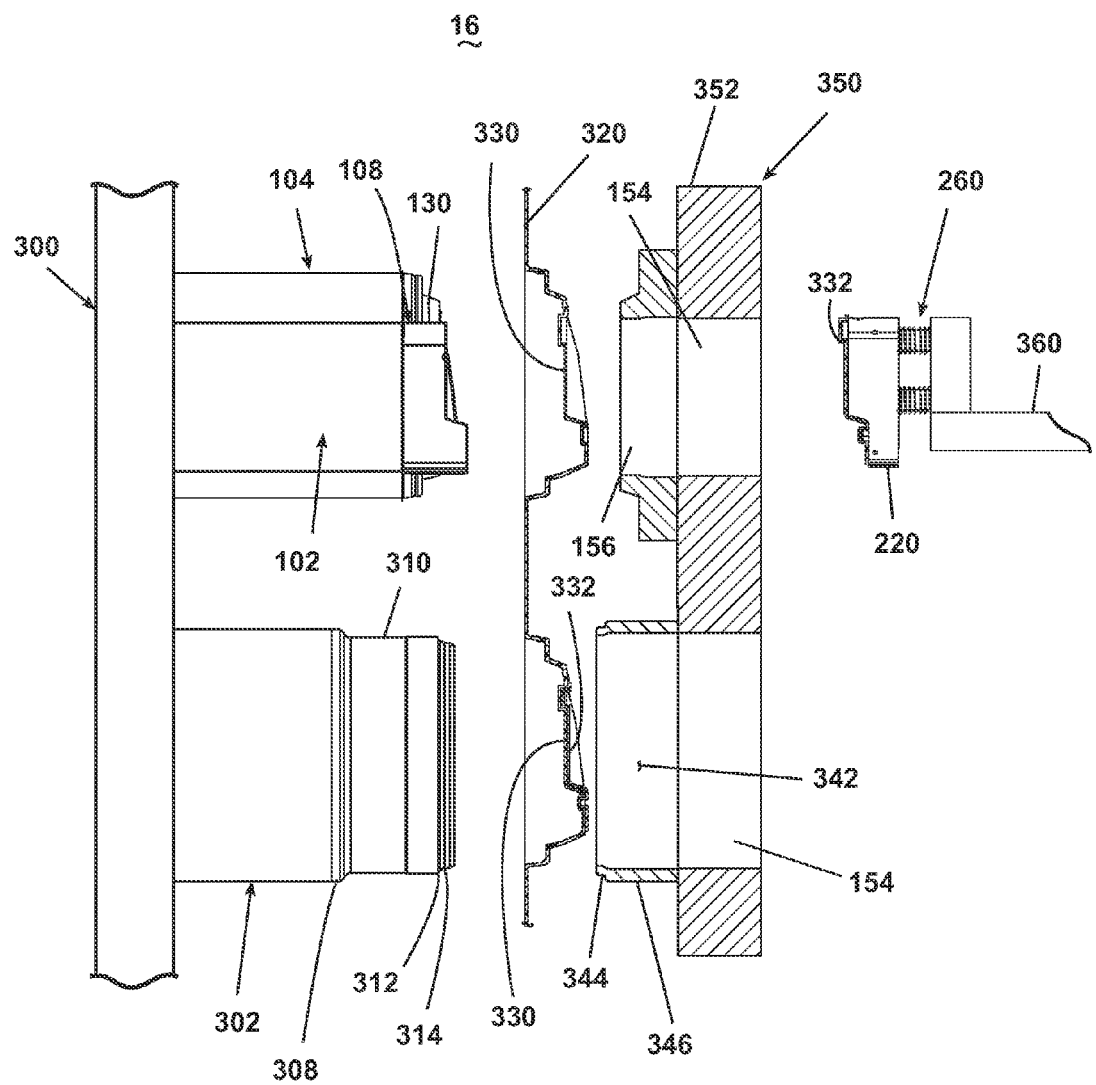
FIG. 29 is a partial sectional view of the second embodiment assembly station shown when the punch tool assembly is nearing a back stroke limit and the tab assembly device is in a back stroke limit.
Figure 30:
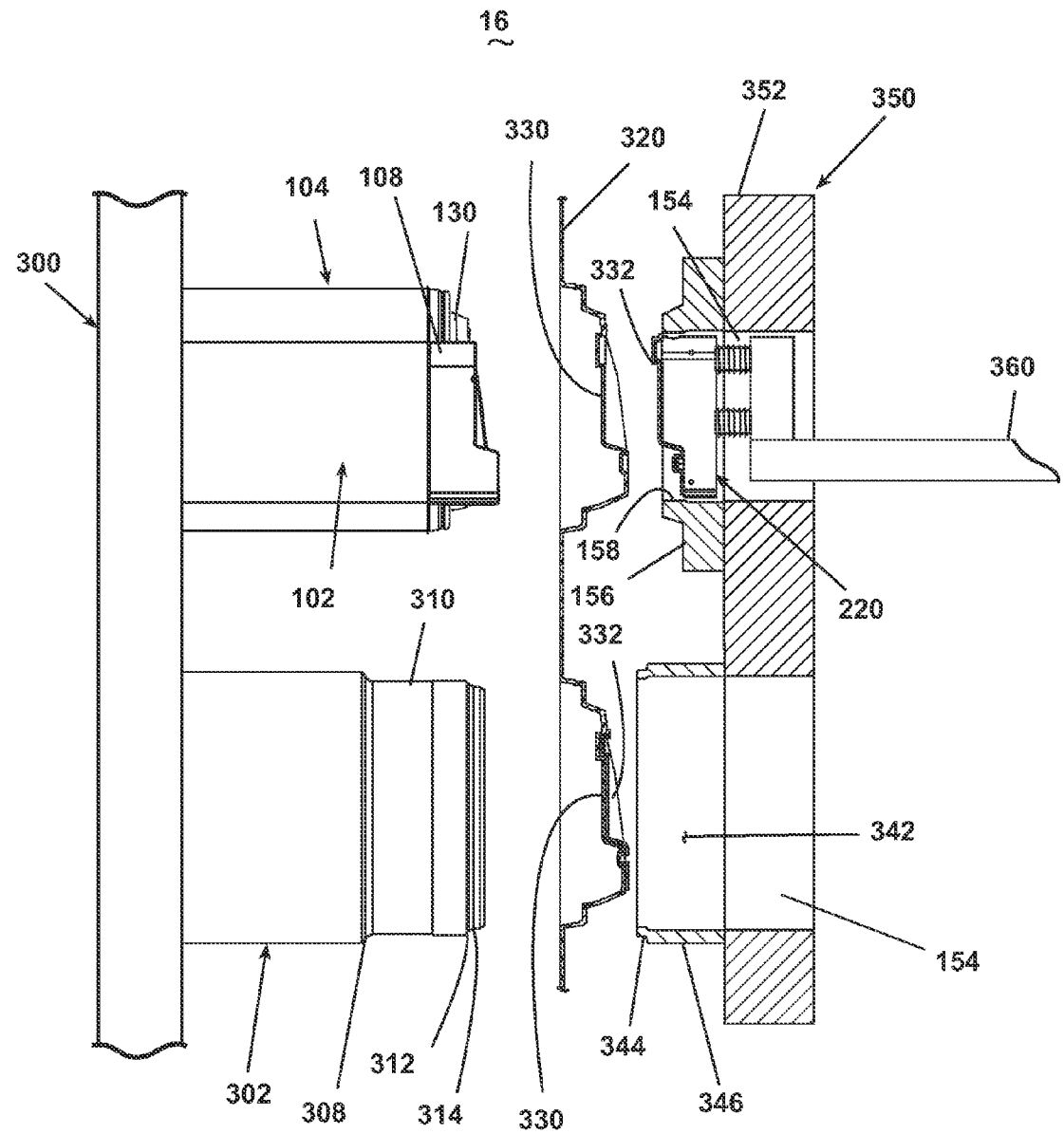
FIG. 30 is a partial sectional view identical to FIG. 29 except the tab assembly device is now advanced to an overstroke position for cleaning out any tab closures that may not have been picked up during the last cycle.
Figure 31:
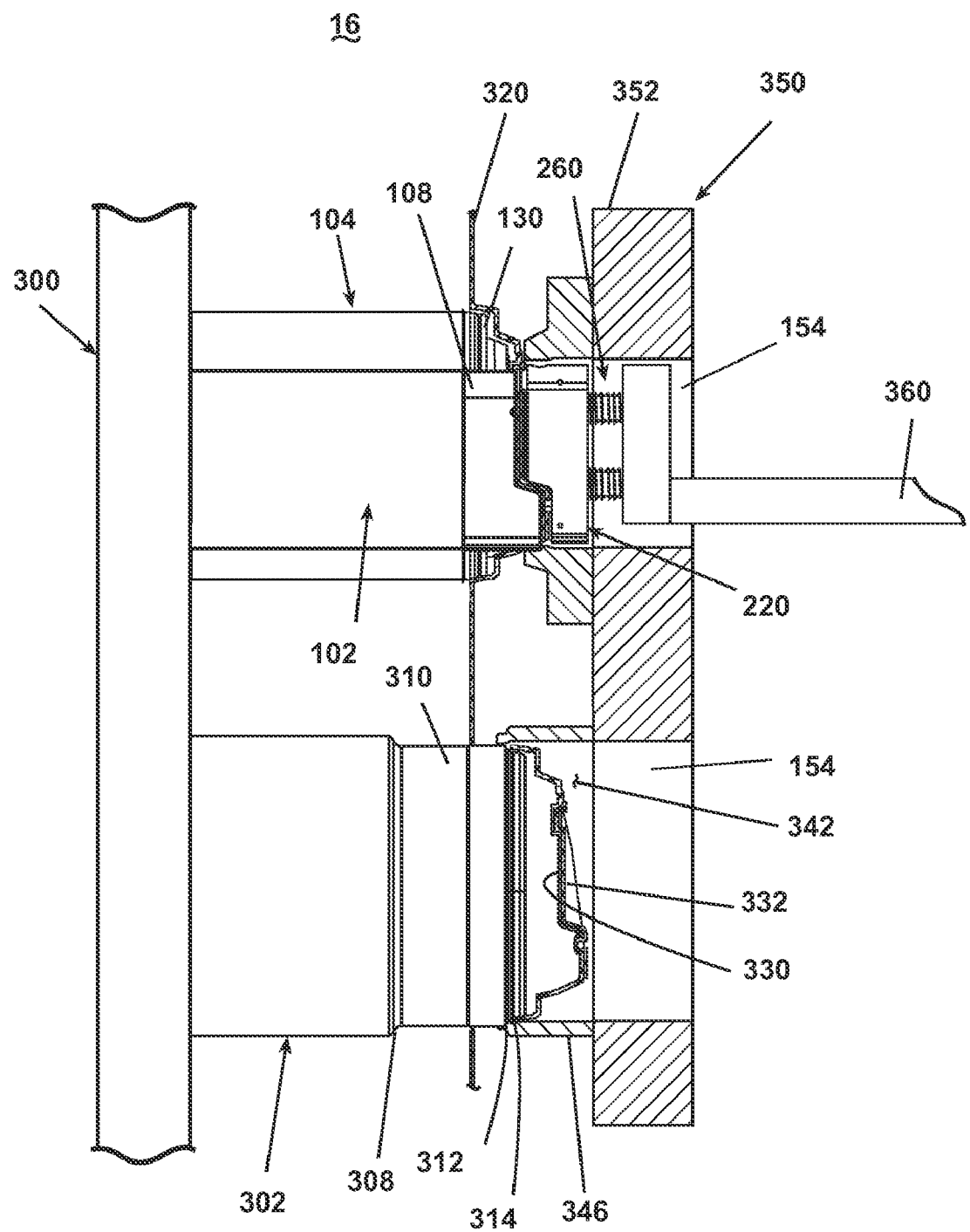
FIG. 31 is a partial sectional view identical to FIGS. 29 and 30 except that the punch tool assembly is shown in a forward-stroke limit position where the tab closure punch has trimmed a tab closure from the web, the tab assembly device is shown in an assembly position where a first reciprocating arm mounts a tab closure to a lid and a second reciprocating arm picks up the trimmed tab closure, and the lid punch has trimmed the assembled lid from the web.

FIGS. 29-31 illustrate the same significant steps in the operation of the second embodiment as disclosed in the first embodiment. FIGS. 29-31 are arranged in pairs 29-29A, 30-30A, and 31-31A. The first drawing of each pair illustrates the operation from the section line 25-25 or side view and shows the operation of the tab punch 108 and lid punch assembly 302 with their corresponding dies. The second drawing of each pair, the "A" drawing, illustrates the operation from a top view and shows the operation of the tab punch 108 and the lid support assembly 104.

Figure 17:
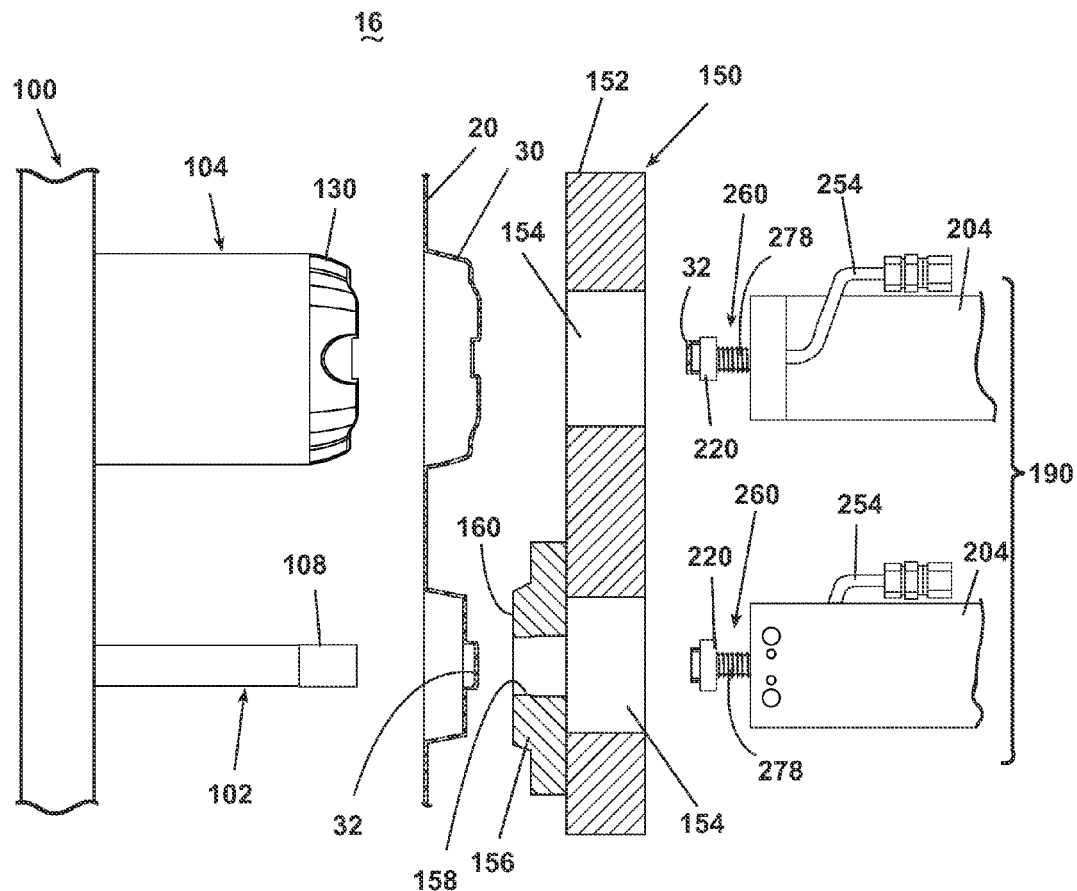
FIG. 17 is a partial sectional view of the first embodiment assembly station wherein the punch tool assembly is nearing a back stroke limit, the lower arm is prepared for picking up a tab closure, and the upper arm is carrying a tab for assembly to the lid.
Figure 29A:
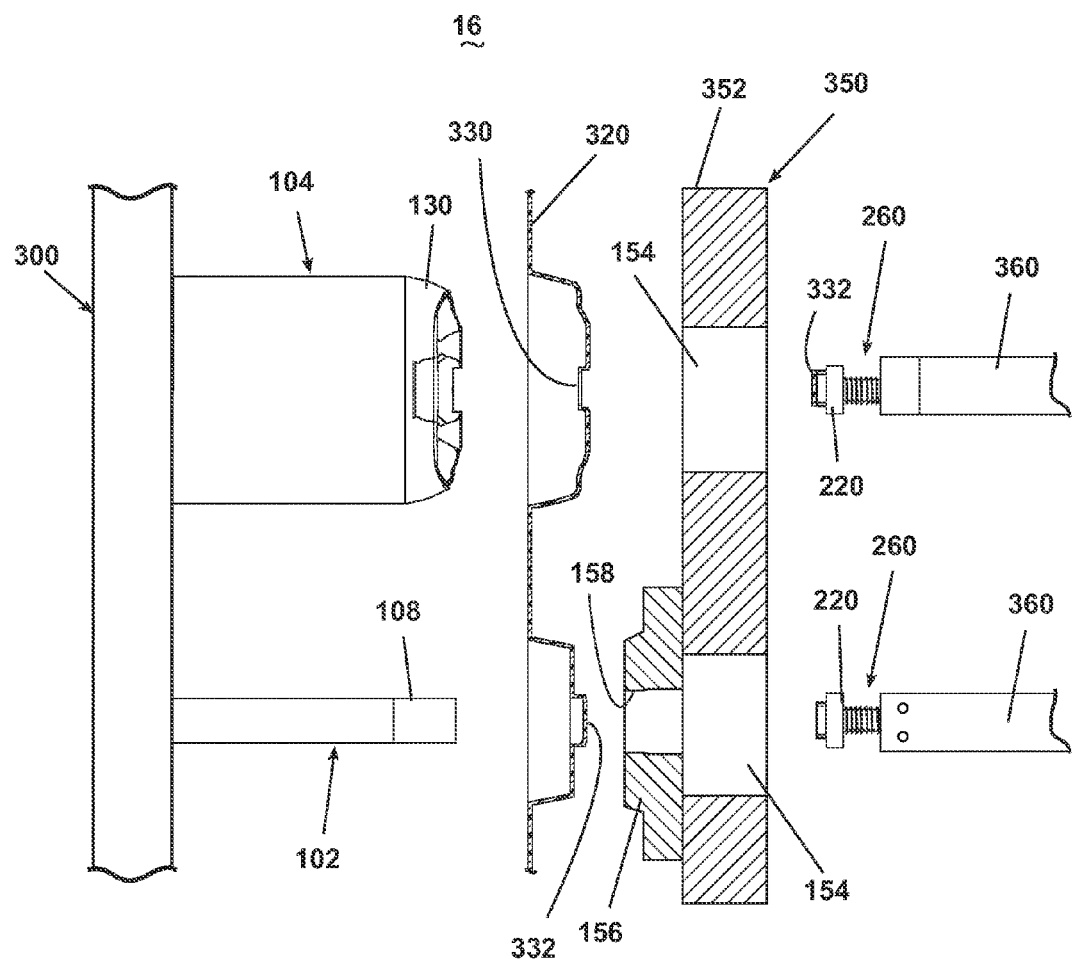
FIG. 29A is a partial sectional view illustrating the relative positions of the punch tool assembly, web, die shoe, and tab assembly device when viewed from above the section shown in FIG. 29.

In FIGS. 29 and 29A, as with the first embodiment shown in FIG. 17, the operation is assumed to begin when the punch tool assembly 300 is near its backstroke. The tab punch assembly 102 and lid punch assembly 302 are in operable juxtaposition to the tab die 156 for punching out the tab closures 332 in the upper row and the assembled lid 330 in the lower row. The receiver arms 360 on the upper receiver frame 362 are aligned with the tab dies 156 to pick up the punched tab closures 332. The receiver arms 360 on the lower receiver arm frame 362 are already carrying a previously punched tab closure 332 and are aligned with the openings 154 for the subsequent assembly of the tab closures 332 to the corresponding lids 330. In general, the separation of the tab closures 332 from the plastic web 320, the retention of the tab closures 332 on the tab receivers 220 by an applied vacuum, and the mounting of the tab closures 332 to the lids 330 are identical to these operations performed with the first embodiment.

The plastic web 320 is advanced to an indexed position in which a row of tab closures 332 and lids 330 is aligned with the tab dies 156 and the access openings 154, respectively, comprising the top row of the die assembly 350. At the same time, a row of lids 330 with assembled tab closures 332 is aligned with the lid die 340 comprising the bottom row of the die assembly 350.

Figure 30A:
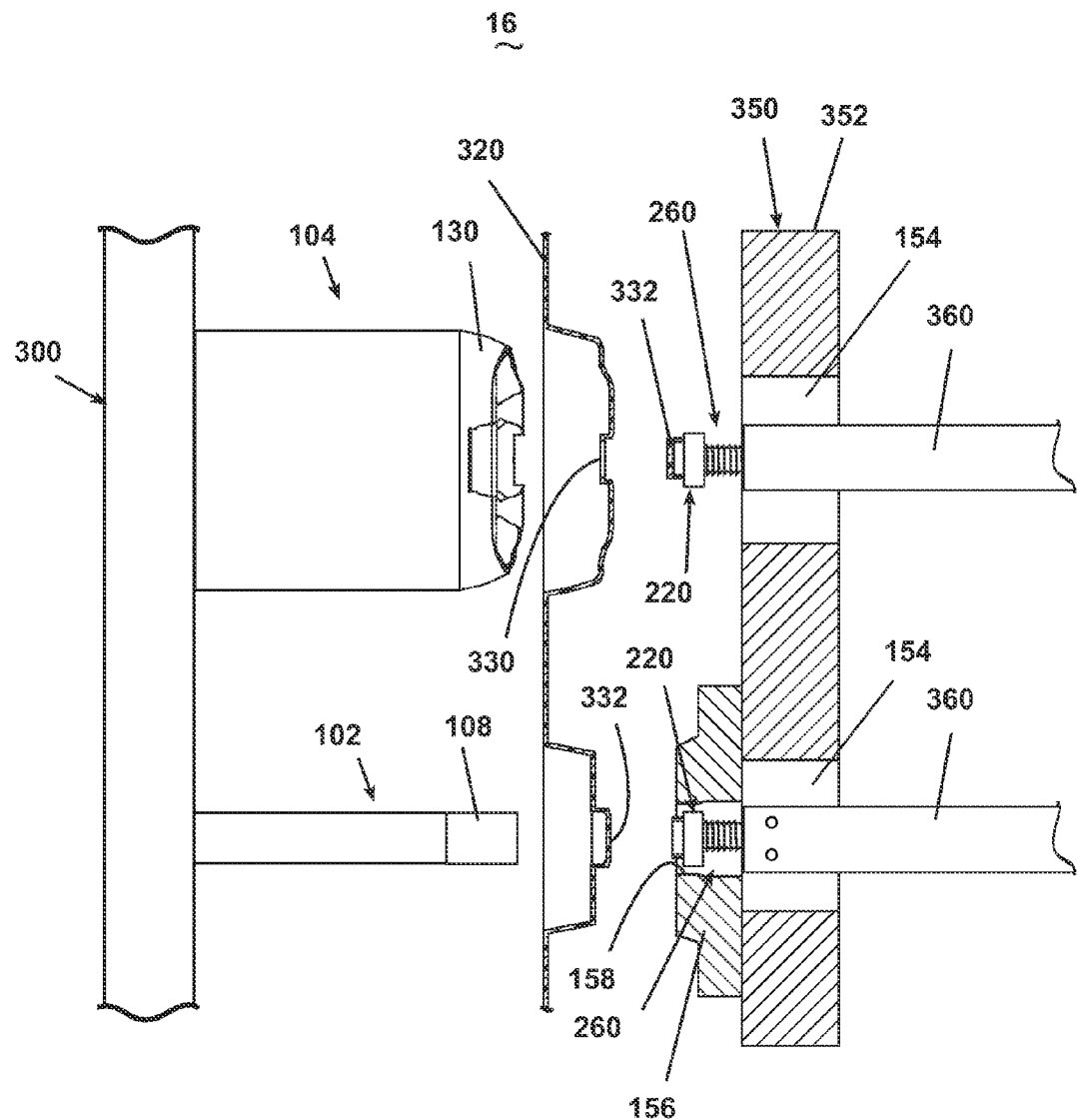
FIG. 30A is a partial sectional view illustrating the relative positions of the punch tool assembly, web, die shoe, and tab assembly device when viewed from above the section shown in FIG. 30.

Referring to FIGS. 30 and 30A, the tab assembly mechanism 354 is then advanced toward the die assembly 350 to extend the tab receivers 220 into and through the die openings 158 to clear the die openings 158 of any tab closures 332 that might remain from a previous operation. The tab assembly mechanism 354 is then withdrawn to move the tab receivers 220 into the standby position, and the punch tool assembly 300 is advanced toward the die assembly 350.

Figure 31A:
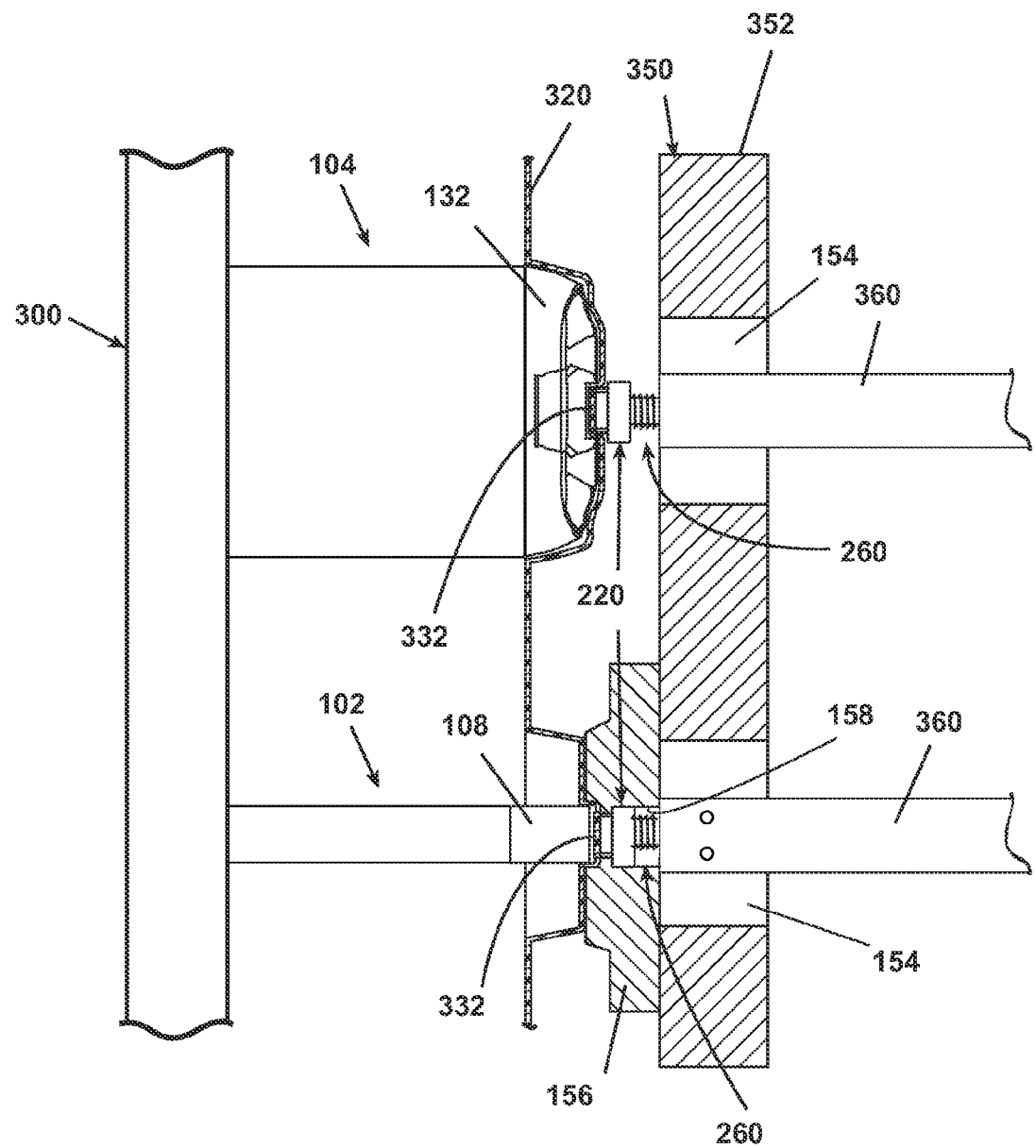
FIG. 31A is a partial sectional view illustrating the relative positions of the punch tool assembly, web, die shoe, and tab assembly device when viewed from above the section shown in FIG. 30.

Referring to FIGS. 31-31A, as the punch tool assembly 300 moves toward the forward stroke limit, the lid support assembly 104 is received within the lids 330, the tab punch assembly 102 initiates contact with the plastic web 320 for removal of a tab closure 332, and the lid punch assembly 302 initiates contact with the plastic web 320 for removal of the assembled lid 330. The tab closures 332 are removed from the plastic web 320 and are picked up by the tab receivers 220 mounted to the receiver arms 360 attached to the upper receiver arm frame 362. In the same operation, the tab closures 332 attached to the receiver arms 360 on the lower receiver arm frame 362 are assembled to the lids 330. In the same operation, the assembled lids 330 are separated from the plastic web 320 and pushed through the lid die opening.

After the tab closures 332 are picked up by the upper receiver arms 360 and the tab closures 332 carried by the lower receiver arms 360 are mounted to the lids 330, the tab assembly devices 356 are moved on the rails away from the die shoe 352 a sufficient distance such that the receiver arms 360 can be reciprocated without contacting the die shoe 352, the punch assembly 300 is moved toward its backstroke position, and the plastic web 320 is indexed one row. The tab closures 332 held by the upper receiver arms 360 are moved horizontally into position by the reciprocating movement of the receiver arm frames 362 for assembly to the lids 330 in response to the servomotors 372. At the same time, the lower receiver arms 360, having assembled their tab closures 332 to the lids 330, are moved horizontally into position for receiving a new set of tab closures 332 as they are separated from the plastic web 320. This process is repeated continuously so long as the plastic web 320 is supplied to the assembly station 16.

Figure 32:
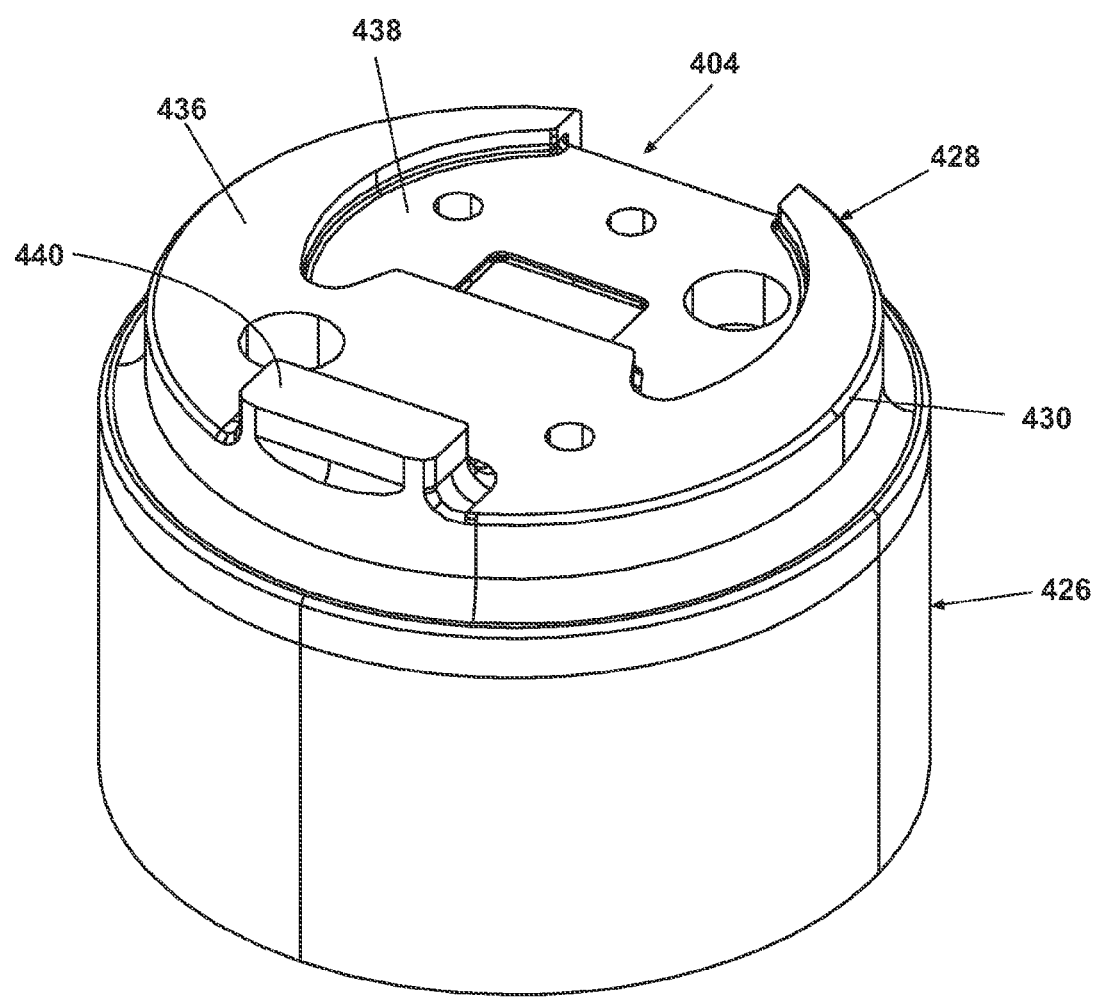
FIG. 32 is a perspective view of an alternative lid support assembly having a reduced area to ease the removal of the lid while still supporting the lid during the assembly of the tab closure.

FIG. 32 illustrates an alternative lid support assembly 404, which can be used in place of any of the previously described lid support assemblies 104. The lid support assembly 404 has the same general structure as the previously described lid support assemblies 104 in that it has a base 426 and a support element 428 having an exterior surface 430. The main difference in the lid support assembly 404 is that the exterior surface 430 is does not conform to the shape of the lid. For example, the exterior surface 430 comprises a peripheral wall, which has a diameter less than the inner diameter of the lid. While the exterior surface 430 does include a top surface support 436, a reservoir support 438, and a drink opening support 440, it does not have the upper support surface 134 as found in the previously described lid support assemblies 104. The structure of the lid support assembly 404 is such that it generally supports only those areas of the lid against which the tab closure will contact during assembly. This structure reduces the surface area of the lid support assembly 404 that will contact the lid and thereby reduces the likelihood that the lid will become stuck on the lid support assembly 404 and ease the removal of the lid from the lid support assembly 404.

While the invention has been specifically described in connection with certain specific embodiments thereof, it is to be understood that this is by way of illustration and not of limitation, and the scope of the appended claims should be construed as broadly as the prior art will permit.

What is claimed is:

1. An apparatus for automatically forming a composite article by assembling first and second workpieces thermoformed in a common plastic sheet comprising a plurality of the first and second workpieces, the apparatus comprising:
    a trimmer for individually trimming at least one of the first workpieces from the plastic sheet, wherein the plastic sheet comprises alternating one of rows and columns of the first workpieces and the second workpieces; and
    a carrier moveable between a first position, where the carrier picks up one of the trimmed first workpieces, and a second position, where the carrier assembles the trimmed first workpiece to one of the second workpieces in the plastic sheet.

2. The apparatus according to claim 1 wherein the carrier moves directly between the first and second positions eliminating the need to temporarily store the trimmed first workpiece prior to assembly to the one of the second workpieces.

3. The apparatus according to claim 2 wherein the carrier assembles the trimmed first workpiece to the one of the second workpieces by a press-fit coupling.

4. The apparatus according to claim 1 wherein there are multiple carriers, with each carrier picking up a different trimmed first workpiece in the first position and assembling it to a different second workpiece.

5. The apparatus according to claim 1 wherein the carrier assembles the trimmed first workpiece to the second workpiece by a press-fit coupling.

6. The apparatus according to claim 5 wherein the press-fit coupling is a snap-fit coupling.

7. The apparatus according to claim 1 wherein the carrier assembles the trimmed first workpiece to the second workpiece by an adhesive coupling.

8. The apparatus according to claim 1 wherein the carrier assembles the trimmed first workpiece to the second workpiece by an ultrasonic weld.

9. The apparatus according to claim 1 wherein the sheet comprises a portion of a web of plastic.

10. The apparatus according to claim 1 wherein the sheet comprises opposing front and rear sides, and the trimmer trims the first thermoformed workpiece from the front side, and the carrier picks up the one of the trimmed first workpieces from the front side and assembles the one of the trimmed first workpieces to the one of the second workpieces on the front side.

11. The apparatus according to claim 1 wherein the carrier is moveable relative to the alternating one of rows and columns between the first and second positions.

12. The apparatus according to claim 1 wherein the carrier comprises a suction device to pick the first workpiece as it is trimmed from the sheet and to hold the trimmed first workpiece as it is assembled to the second workpiece.

13. The apparatus according to claim 12 wherein the carrier comprises a force reliever to control the amount of force applied by the carrier to the second workpiece during the assembly of the trimmed first workpiece to the second workpiece.

14. The apparatus according to claim 13 wherein the carrier comprises a reciprocating arm on an end of which the suction device is mounted.

15. The apparatus according to claim 14 wherein the force reliever mounts the suction device to the end of the arm.

16. The apparatus according to claim 15 wherein the reciprocating arm reciprocates between a pick-up position that corresponds to the first position, and an assembly position that corresponds to the second position.

17. The apparatus according to claim 16 wherein the reciprocating arm reciprocates between the pick-up and assembly positions in a direction that is either parallel or transverse to the machine direction as defined by the movement of the plastic sheet through the apparatus.

18. The apparatus according to claim 17 wherein the trimmer comprises a first punch and die set for trimming the first workpiece from the plastic sheet.

19. The apparatus according to claim 18 wherein the die comprises an inlet opening in which the punch is received to trim the first workpiece from the plastic sheet when the plastic sheet is positioned between the punch and die, and an outlet opening into which the reciprocating arm extends to pick up the trimmed first workpiece when the reciprocating arm is in the pick-up position.

20. The apparatus according to claim 19 wherein the carrier further comprises a moveable platform carrying the reciprocating arm and which is moveable between a first position where the reciprocating arm is positioned within the die outlet, and a second position where the reciprocating arm is positioned outside of the die outlet.

21. The apparatus according to claim 20 wherein there are multiple reciprocating arms, with at least one of the arms at the pick-up position when another of the arms is at the assembly position.

22. The apparatus according to claim 21 and further comprising a second trimmer having a second punch and die set for trimming the assembled first and second workpieces from the plastic sheet.

23. An apparatus for automatically forming a composite article by assembling first and second workpieces thermoformed in a common plastic sheet comprising a plurality of the first and second workpieces, the apparatus comprising:
  a trimmer comprising a first punch and die set for trimming at least one of the first workpieces from the plastic sheet; and
  a carrier moveable between a first position, where the carrier picks up one of the trimmed first workpieces, and a second position, where the carrier assembles the trimmed first workpiece to one of the second workpieces in the plastic sheet by a press-fit coupling, wherein the carrier is movable directly between the first and second positions eliminating the need to temporarily store the trimmed first workpiece prior to assembly to the one of the second workpieces.

24. The apparatus according to claim 23 wherein the carrier comprises a suction device to pick the first workpiece as it is trimmed from the sheet and to hold the trimmed first workpiece as it is assembled to the second workpiece.

25. The apparatus according to claim 24 wherein the carrier comprises a force reliever to control the amount of force applied by the carrier to the second workpiece during the assembly of the trimmed first workpiece to the second workpiece.

26. The apparatus according to claim 25 wherein the carrier comprises a reciprocating arm on an end of which the suction device is mounted.

27. The apparatus according to claim 26 wherein the force reliever mounts the suction device to the end of the arm.

28. The apparatus according to claim 27 wherein the reciprocating arm reciprocates between a pick-up position that corresponds to the first position, and an assembly position that corresponds to the second position.

29. The apparatus according to claim 28 wherein the reciprocating arm reciprocates between the pick-up and assembly positions in a direction that is either parallel or transverse to the machine direction as defined by the movement of the plastic sheet through the apparatus.

30. The apparatus according to claim 23 wherein the die comprises an inlet opening in which the punch is received to trim the first workpiece from the plastic sheet when the plastic sheet is positioned between the punch and die, and an outlet opening into which the reciprocating arm extends to pick up the trimmed first workpiece when the reciprocating arm is in the pick-up position.

31. The apparatus according to claim 30 wherein the carrier further comprises a moveable platform carrying the reciprocating arm and which is moveable between a first position where the reciprocating arm is positioned within the die outlet, and a second position where the reciprocating arm is positioned outside of the die outlet.

32. The apparatus according to claim 31 wherein there are multiple reciprocating arms, with at least one of the arms at the pick-up position when another of the arms is at the assembly position.

33. The apparatus according to claim 32 and further comprising a second trimmer having a second punch and die set for trimming the assembled first and second workpieces from the plastic sheet.

* * * * *